(12) United States Patent
Unagami et al.

(10) Patent No.: US 10,303,893 B2
(45) Date of Patent: May 28, 2019

(54) SEARCH METHOD, SEARCH DEVICE, SEARCH SYSTEM, AND PROGRAM

(71) Applicant: Panasonic Intellectual Property Corporation of America, Torrance, CA (US)

(72) Inventors: Yuji Unagami, Osaka (JP); Natsume Matsuzaki, Osaka (JP); Shota Yamada, Tokyo (JP); Nuttapong Attrapadung, Saitama (JP); Takahiro Matsuda, Ibaraki (JP); Goichiro Hanaoka, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 301 days.

(21) Appl. No.: 15/366,129

(22) Filed: Dec. 1, 2016

(65) Prior Publication Data

US 2017/0169241 A1 Jun. 15, 2017

(30) Foreign Application Priority Data

Dec. 14, 2015 (JP) ................................ 2015-243496
Aug. 4, 2016 (JP) ................................ 2016-154076

(51) Int. Cl.
*G06F 21/00* (2013.01)
*G06F 21/62* (2013.01)
(Continued)

(52) U.S. Cl.
CPC ...... *G06F 21/6218* (2013.01); *G06F 12/1408* (2013.01); *G09C 1/00* (2013.01);
(Continued)

(58) Field of Classification Search
CPC ............. G06F 21/6218; G06F 12/1408; G06F 2212/1052; H04L 9/3026; H04L 9/008; H04L 63/0281; G09C 1/00
See application file for complete search history.

(56) References Cited

U.S. PATENT DOCUMENTS

2004/0179679 A1* 9/2004 Hawkes ................ H04L 9/3093
380/30
2013/0318351 A1* 11/2013 Hirano .................. H04L 9/3073
713/168
(Continued)

FOREIGN PATENT DOCUMENTS

WO 2014/185450 11/2014

OTHER PUBLICATIONS

The Extended European Search Report dated May 10, 2017 for the related European Patent Application No. 16201667.9.
(Continued)

*Primary Examiner* — Mahfuzur Rahman
(74) *Attorney, Agent, or Firm* — Greenblum & Bernstein, P.L.C.

(57) ABSTRACT

A data search method of a first device storing multiple sets of privacy data acquired from multiple persons and multiple reference features corresponding to the multiple sets of privacy data, where the multiple reference features each are expressed by an n-dimensional vector, includes receiving first encrypted features from a second device connected to the first device, generating multiple second converted features by a second conversion of the multiple reference features, generating of multiple second encrypted features by encrypting the multiple second converted features using inner product encryption, acquiring multiple inner product values by performing inner product computation of each of the first encrypted features and the multiple second encrypted features, determining whether or not the first
(Continued)

features and the first reference features are similar, and transmitting of first privacy data corresponding to the first reference features out of the multiple sets of privacy data to the second device.

9 Claims, 11 Drawing Sheets

(51) Int. Cl.
*G06F 12/14* (2006.01)
*H04L 29/06* (2006.01)
*G09C 1/00* (2006.01)
*H04L 9/00* (2006.01)
*H04L 9/30* (2006.01)

(52) U.S. Cl.
CPC ............ *H04L 9/008* (2013.01); *H04L 9/3026* (2013.01); *H04L 63/0281* (2013.01); *G06F 2212/1052* (2013.01)

(56) References Cited

U.S. PATENT DOCUMENTS

2014/0185797 A1* 7/2014 Yasu Da; Masaya ...................... H04L 9/008 380/44
2016/0080333 A1 3/2016 Isshiki

OTHER PUBLICATIONS

Unagami Yuji et al: "Private similarity searchable encryption for Euclidean distance", 2016 International Symposium on Information Theory and Its Applications (ISITA), IEICE, Oct. 30, 2016 (Oct. 30, 2016), pp. 718-722, XP033057239.

Allison Bishop et al, "Function-Hiding Inner Product Encryption", Advances in Cryptology—ASIACRYPT 2015, published by Springer Berlin Heidelberg (URL: https://eprint.iacr.org/2015/672.pdf).

Emily Shen et al., "Predicate Privacy in Encryption Systems", Theory of Cryptography, published by Springer Berlin Heidelberg, Dec. 2008 (URL: https://eprint.iacr.org/2008/536.pdf).

\* cited by examiner

FIG. 6A

REFERENCE FEATURE STORAGE UNIT — 201

| IDi | REFERENCE FEATURES Eyi |
|---|---|
| 1 | $Y_1 = (y_{11}, y_{12}, y_{13}, ..., y_{1n})$ |
| 2 | $Y_2 = (y_{21}, y_{22}, y_{23}, ..., y_{2n})$ |
| 3 | $Y_3 = (y_{31}, y_{32}, y_{33}, ..., y_{3n})$ |
| ⋮ | ⋮ |

FIG. 6B

REFERENCE DATA STORAGE UNIT — 207

| IDi | REFERENCE DATA Ezi |
|---|---|
| 1 | Z1 = (OCTOBER, 2013: HOSPITALIZED DUE TO STROKE) |
| 2 | Z2 = (FEBRUARY, 1999: TREATMENT STARTED FOR DIABETES) |
| 3 | Z1 = (MARCH 2010: DIETARY INSTRUCTIONS, FULLY HEALED AS OF 2012) |
| ⋮ | ⋮ |

FIG. 7

BEFORE CONVERSION $Y_1 = (y_{11}, y_{12}, y_{13}, ..., y_{1n})$

↓ — 202

REFERENCE FEATURE CONVERSION UNIT

AFTER CONVERSION ↓

$Y' = (1, \Sigma y_{1j}^2, -2y_{11}, -2y_{12}, ..., -2y_{1n})$

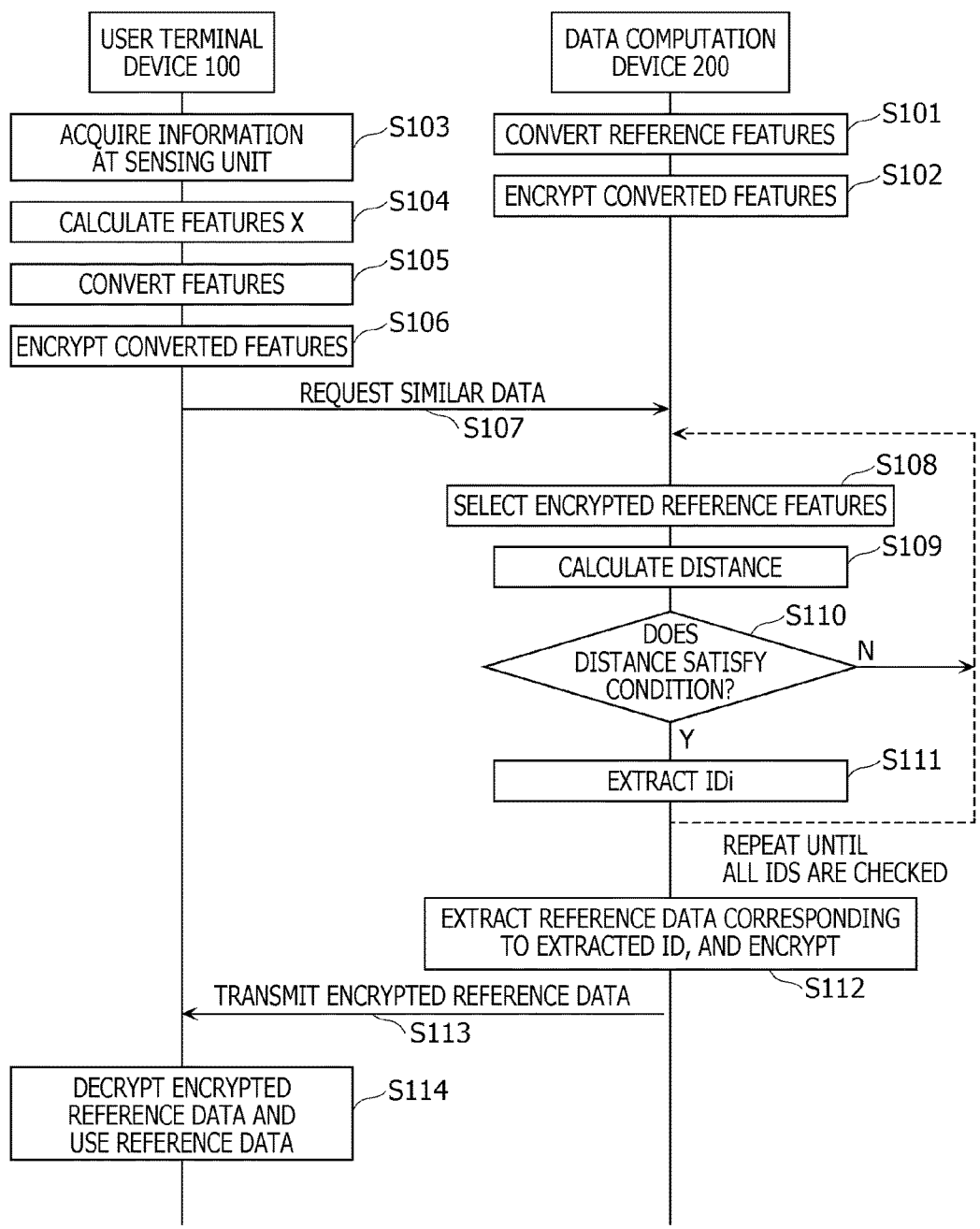

FIG. 9A

| TRANSMITTING PARTY | RECEIVING PARTY | COMMAND | DATA |
|---|---|---|---|
| USER TERMINAL DEVICE 100 | DATA COMPUTATION DEVICE 200 | REQUEST COMMAND SIMILAR DATA | ENCRYPTED FEATURES |

FIG. 9B

| TRANSMITTING PARTY | RECEIVING PARTY | COMMAND | DATA | |
|---|---|---|---|---|
| DATA COMPUTATION DEVICE 200 | USER TERMINAL DEVICE 100 | REPLY COMMAND SIMILAR DATA | ENCRYPTED REFERENCE DATA 1 | ENCRYPTED REFERENCE DATA 2 |

SEARCH METHOD, SEARCH DEVICE, SEARCH SYSTEM, AND PROGRAM

BACKGROUND

1. Technical Field

The present disclosure relates to a search method, a search device, and a search system, in which a similarity search is performed while keeping content secret by encryption.

2. Description of the Related Art

In recent years, there are systems where a user can measure blood pressure or the like, for example, in the home, and transmit information of the measurement results from a user terminal to a server. This information is analyzed at the server, and the user is provided with dietary advice and the like. This system is capable of providing the user with useful advice by performing this analysis referencing not only past information of the user him/herself, but other similar cases as well. Searching for similar cases (similarly search) at the server preferably is performed with user information and the like kept secret through encryption, from the perspective of protection of privacy. International Publication No. 2014/185450 discloses technology for a verification system where data to be authenticated and authentication data are verified while left encrypted, by using additive homomorphic encryption, thereby keeping the data secret to the server.

Also referenced in the present specification are Allison Bishop et al, "Function-Hiding Inner Product Encryption", Advances in Cryptology—ASIACRYPT 2015, published by Springer Berlin Heidelberg (URL: https://eprint.iacr.org/2015/672.pdf), hereinafter referred to simply as "BISHOP", and Emily Shen et al., "Predicate Privacy in Encryption Systems", Theory of Cryptography, published by Springer Berlin Heidelberg (URL: https://eprint.iacr.org/2008/536.pdf), hereinafter referred to simply as "SHEN".

However, conventional similarity searching required the user terminal to encrypt user information and transmit to the server, and the user terminal to verify reference information that is the results of the server having performed the search with the information left encrypted, is if the amount of reference information is great, the processing load on the user terminal is great, and the amount of communication increases.

SUMMARY

One non-limiting and exemplary embodiment provides a search method where the processing load on the user terminal can be suppressed and the amount of communication can be suppressed when searching at a server keeping user information secret. One non-limiting and exemplary embodiment provides a search system and computer program where the processing load on the user terminal can be suppressed and the amount of communication can be suppressed when searching.

In one general aspect, the techniques disclosed here feature a data search method of a first device that includes a memory storing a plurality of sets of privacy data acquired from a plurality of persons and a plurality of reference features corresponding to the plurality of sets of privacy data, the plurality of reference features each being expressed by an n-dimensional vector. The method includes: receiving first encrypted features from a second device connected to the first device via a communication network, the first encrypted features having been generated by encrypting first converted features, the first converted features having been generated by a first conversion of first features extracted from privacy data of a user, the first encrypted features having been generated by encrypting the first converted features using inner product encryption, the first features being expressed by an n-dimensional vector, and the first converted features being expressed by an n-dimensional vector; generating a plurality of second converted features by a second conversion of the plurality of reference features; generating of a plurality of second encrypted features by encrypting the plurality of second converted features using inner product encryption; acquiring a plurality of inner product values by performing inner product computation of each of the first encrypted features and the plurality of second encrypted features; determining, when a first inner product value of the plurality of inner product values is not greater than a predetermined threshold value, and the first inner product value indicates a Euclidean distance between the first features and first reference features out of the plurality of reference features, that the first features and the first reference features are similar; and transmitting first privacy data corresponding to the first reference features out of the plurality of sets of privacy data to the second device. The first features are subjected to the first conversion and the plurality of reference features are subjected to the second conversion so that a product of an i-dimensional component (where i≤n) of the first converted features and an i-dimensional component of each of the plurality of second converted features form a polynomial following unfolding of the Euclidean distance between the first features and the plurality of reference features.

According to the present disclosure, processing load on the user terminal can be suppressed and the amount of communication can be suppressed when searching at a server keeping user information secret.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6A is a diagram illustrating an example of stored contents of a reference feature storage unit in a data computation device;

FIG. 6B is a diagram illustrating an example of stored contents of a reference data storage unit in the data computation device;

FIG. 7 is a diagram illustrating an example of conversion of reference features at the data computation device according to the first embodiment;

FIG. 8 is a sequence diagram illustrating operations of the search system according to the first embodiment;

FIG. 9A is a diagram illustrating an example of a data format of communication data from a user terminal to a data computation device;

FIG. 9B is a diagram illustrating an example of a data format of communication data from the user terminal to the data computation device;

DETAILED DESCRIPTION

Figure 1A:
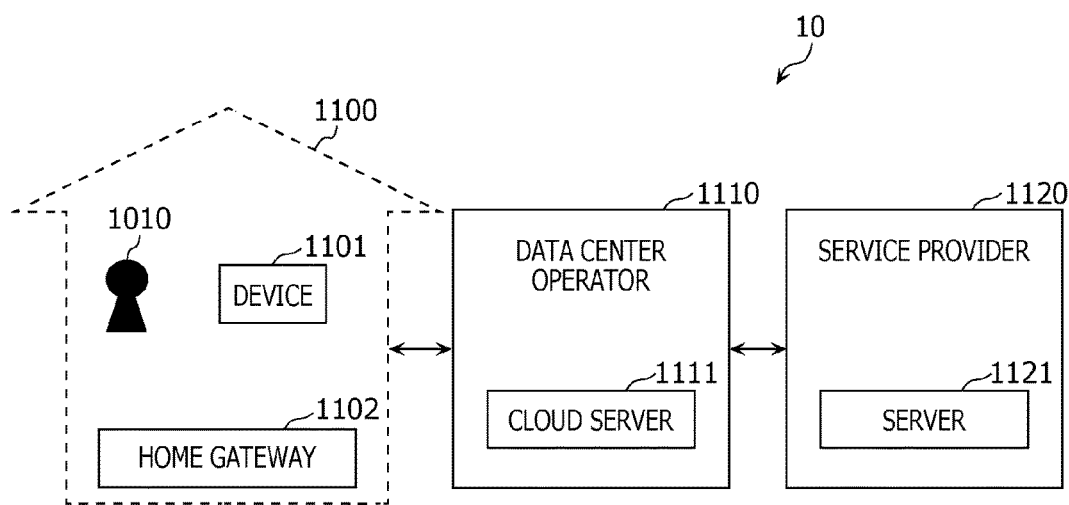
FIG. 1A is a diagram illustrating an overview of a service that a search system according to an embodiment provides.

Underlying Knowledge Forming Basis of the Present Disclosure

In the field of a user terminal causing a server to perform a search, with data kept secret to the server, homomorphic encryption can be used for encryption when performing similarity searching to search for reference features similar to features with data (features) left encrypted. However, the computation that can be performed using homomorphic encryption is only one of addition and multiplication. One of addition and multiplication is not sufficient to derive similarity indices when using inner product or the like to find the Euclidian distances between features and reference features, as indices showing similarity in similarity searches where features regarding which similarities are to be searched are expressed by vectors having multiple components (elements). Note that decomposing features into individual components to have the user terminal perform similarity searching at the server increases the processing load at the user terminal.

It has thus been found desirable to suppress processing load on the user terminal and suppress the amount of communication when searching at a server keeping user information secret. To this end, the present inventors have reached a system that performs similarity searching using an encryption system relating to inner product computation where features are converted. Provided are a search method, search system, and computer program used in the search system, using the encryption system.

A search method according to an aspect of the present disclosure is a data search method of a first device. The first device includes a memory storing a plurality of sets of privacy data acquired from a plurality of persons and a plurality of reference features corresponding to the plurality of sets of privacy data, the plurality of sets of reference features each being expressed by an n-dimensional vector. The method includes: receiving first encrypted features from a second device connected to the first device via a communication network, the first encrypted features having been generated by encrypting first converted features, the first converted features having been generated by a first conversion of first features extracted from privacy data of a user, the first encrypted features having been generated by encrypting the first converted features using inner product encryption, the first features being expressed by an n-dimensional vector, and the first converted features being expressed by an n-dimensional vector; generating a plurality of second converted features by a second conversion of the plurality of reference features; generating a plurality of second encrypted features by encrypting the plurality of second converted features using inner product encryption; acquiring a plurality of inner product values by performing inner product computation of each of the first encrypted features and the plurality of second encrypted features; determining, when a first inner product value of the plurality of inner product values is not greater than a predetermined threshold value, and the first inner product value indicates a Euclidean distance between the first features and first reference features out of the plurality of reference features, that the first features and the first reference features are similar; and transmitting first privacy data corresponding to the first reference features out of the plurality of sets of privacy data to the second device, wherein the first features are subjected to the first conversion and the plurality of reference features are subjected to the second conversion so that a product of an i-dimensional component (where i≤n) of the first converted features and an i-dimensional component of each of the plurality of second converted features form a polynomial following unfolding of the Euclidean distance between the first features and the plurality of reference features.

According to this configuration, inner product computation can be performed at the first device (e.g., data computation device) in similarity searching with user information encrypted and kept secret, thereby performing determination of a condition relating to similarity. The processing load of the second device (e.g., user terminal device) can be suppressed and the amount of communication can be suppressed.

The privacy data of the user may include vital signs data of the user.

According to this configuration, reference data of information or the like relating to health or disease or the like that is closely related to vital data can be acquired, while keeping the vital data of the user secret.

The privacy data of the user may include a history of the user having operated a device.

According to this configuration, reference data of information or the like that is closely related to history of operations of a device such as electric equipment or a moving body (vehicle or the like) can be acquired, while keeping the operations thereof by the user secret.

The first features may include a component indicating an index relating to at least one of a shape, a size, a weight, a state, and a movement, of all or one part of a body of the user.

According to this configuration, reference data of information or the like relating to health or disease or the like that is closely related to vital data can be acquired, while keeping the vital data of the user secret.

The plurality of sets of privacy data may include vital signs data of the plurality of persons.

According to this configuration, privacy data of a plurality of people can be reference while being kept secret.

The first features may be X=(x1, x2, x3, ..., xn), the first features may be converted by the first conversion into X', where X'=($\Sigma$xj$^2$, 1, x1, x2, Xn), which are the first converted features, the plurality of reference features may be Yk=(y1, y2, y3, ..., yn), where k≥2, and the plurality of reference features may be each converted by the second conversion into Yk', where Yk'=(1, $\Sigma$yj$^2$, −2y1, −2y2, −2yn) and where k≥2, which are the plurality of second converted features.

According to this configuration, efficient determination regarding similarity among vectors having multiple components can be made, based on Euclidean distance indicated by inner product values, with the vectors kept encrypted by inner product encryption.

The first features may be X=(x1, x2, x3, ..., xn), the first features may be converted by the first conversion into X', where X'=($\Sigma$(wj·xj$^2$), 1, x1, x2, Xn), which are the first converted features, the plurality of reference features may be Yk=(y1, y2, y3, ..., yn), where k≥2, the plurality of reference features may be each converted by the second conversion into Yk', where Yk1'=(1, $\Sigma$(wj·yj$^2$), −2w1·y1, −2w2·y2, ..., −2wn·yn), which are the plurality of second converted features, and the Euclidean distance may include weighted Euclidean distance.

According to this configuration, determination regarding similarity can be made by weighted Euclidean distance.

It should be noted that general or specific embodiments may be implemented as a system, a method, an integrated circuit, a computer program, a storage medium such as a computer-readable CD-ROM or the like, or any selective combination of system, method, integrated circuit, computer program, and storage medium.

Embodiments of the present disclosure will be described in detail with reference to the drawings. Note that the embodiments described below are all specific examples of the present disclosure. Values, shapes, components, arrangement of components, steps, orders of steps, and so forth in the following embodiments are only exemplary, and do not restrict the present disclosure. Components in the following embodiments which are not included in an independent Claim indicating the highest concept are described as being optional components. Also, in all of the embodiments, the contents of each can be combined. It should be note that the drawings are schematic drawings, and are not necessarily illustrated with strict accuracy.

Overview of Service that is Provided

First, an overview of the service that the search system according to an embodiment provides will be described. FIG. 1A is a diagram illustrating an overview of the service that a search system 10 according to an embodiment provides. The search system 10 includes a group 1100, a data center operator 1110, and a service provider 1120.

The group 1100 is a facility (e.g., a building, a house, etc.) of a corporation, an organization, a home, or the like, for example; the scale thereof is irrelevant. The group 1100 has a device 1101 and a home gateway 1102. The device 1101 has a user interface for exchanging information with the user by some sort of method. The user interface may be a sensor or the like, that performs sensing (measurement) regarding the user. The device 1101 is a device capable of connecting to the Internet (e.g., a smartphone, personal computer (PC), television set, etc.), for example. Note that the device 1101 may be incapable of connecting to the Internet on its own (e.g., a washing machine, a refrigerator, etc.), or may be a device that can be connected to the Internet via the home gateway 1102. There are cases where the home gateway 1102 is not necessary. A user 1010 uses the device 1101. The device 1101 may be a device capable of connecting to the Internet via wireless connection (e.g., a smartphone, personal computer (PC), laptop PC, etc.), for example, and in this case the user 1010 and device 1101 do not necessarily have to be located within the group 1100. For example, the user 1010 and device 1101 may be located within a moving body, such as a vehicle, aircraft, or the like. The device 1101 is not limited to being a singular device, and a configuration may be made where the device 1101 is made up of multiple devices.

Figure 1B:
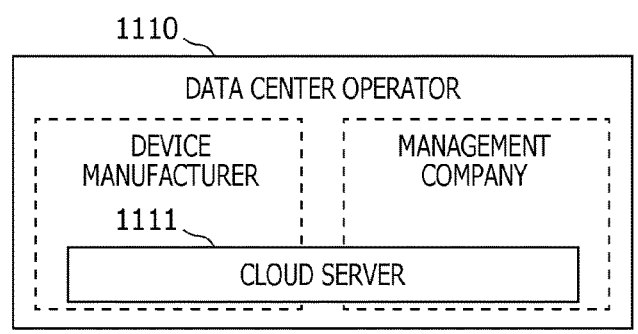
FIG. 1B is a diagram illustrating an example of a data center operator according to an embodiment.

The data center operator 1110 includes a cloud server 1111. The cloud server 1111 is a computer, such as a virtual server for example, which collaborates with various devices over the Internet. The cloud server 1111 primarily manages massive data (big data) or the like that is difficult to handle with normal database management tools and the like. The data center operator 1110 manages data, manages the cloud server 1111, and so forth. The data center operator 1110 is not restricted just to corporations performing management of data and management of the cloud server 1111, and may perform other operations as well. For example, the data center operator 1110 may be a device manufacturer that develops or manufactures the device 1101. The data center operator 1110 is not restricted to being a single corporation, and in a case where a device manufacturer and a management company manage data or manage the cloud server 1111 either conjointly or in shared manner, as illustrated in FIG. 1B, both the device manufacturer and the management company can serve as the data center operator 1110.

The service provider 1120 includes a server 1121. The server 1121 is realized by one or multiple computers. The scale of the server 1121 is irrelevant, and may include storage such as a large-capacity hard disk or the like, or may just have memory or the like in a PC, for example. Further, the server 1121 does not necessarily have to have a storage medium.

Next, the flow of information in the above-described search system 10 will be described. The device 1101 in the group 1100 transmits information, generated based on information acquired via the user interface, to the cloud server 1111 of the data center operator 1110, either directly or via the home gateway 1102. The user interface of the device 1101 used for input by the user 1010 is, for example, a sensor, keyboard, touch panel, or alternatively an audio input device that uses known voice recognition technology or the like, for example. The cloud server 1111 acquires transmitted information from the device 1101. This transmitted information is information generated based on various types of information acquired by user operations or user measurement (vital data of the user, log information based on device operations, and so forth). Log information of the device is information the content of having operated of the device 1101, state, date and time of operation, and so forth. For example, log information may include television viewing history, recorder programming information, date and time of the washing machine running, amount of laundry, date and time of the refrigerator door opening and closing, number of times of the refrigerator door opening and closing, and so forth, but is not restricted to these, and various types of information which can be acquired from the various types of devices may be included.

Next, the cloud server 1111 of the data center operator 1110 transmits information based on the transmitted information from the device 1101, to the server 1121 of the service provider 1120. This information may include information that is the same as at least part of the transmitted information, or may be information obtained as a result of subjecting the transmitted information to processing such as computation or the like, that does not include information that is the same as the transmitted information. The increment of transmitting information based on the transmitted information is not restricted, and may be any increment. The server 1121 acquires information from the cloud server 1111.

The server 1121 of the service provider 1120 identifies information to be presented to the user, in accordance with the information from the cloud server 1111, and transmits the information to be provided to the cloud server 1111. The cloud server 1111 transfers information for presentation from the server 1121 to the device 1101, or transmits information, obtained as the result of having subjected the information for presentation to processing such as computation or the like to the device 1101. Thus, information is provided to the user 1010 from the user interface of the device 1101. Examples of an user interface used to provide information to the user 1010 of the device 1101 include a display, an audio output device using known speech synthesis technology, and so forth.

Note that the server 1121 may acquire information from the user 1010 and provide information to be provided, by communicating with the device 1101 without going through the cloud server 1111. Also, the search system 10 may be of a different arrangement from the example described above. For example, the data center operator 1110 and service provider 1120 may be omitted from the search system 10, and information to be provided may be identified based on information that the device 1101 has acquired from the user, and the information to be provided may be provided to the user.

First Embodiment

An example of a search system 10 according to a first embodiment will be described below with reference to the drawings.

1.1 Overall Configuration of Search System

Figure 2:
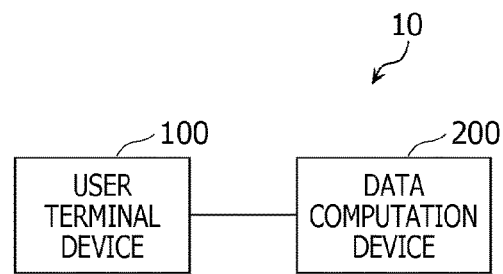
FIG. 2 is a schematic configuration diagram illustrating the entirety of a search system according to a first embodiment.

FIG. 2 is a schematic configuration diagram illustrating the entirety of the search system 10 according to the first embodiment. The search system 10 includes a user terminal device 100 and a data computation device 200. Although FIG. 2 illustrates one each of the user terminal device 100 and data computation device 200, it is sufficient to have one or more of each; multiple user terminal devices 100 and data computation devices 200 may be provided. The arrangement of connecting the devices may be cabled (cable network, dedicated line, etc.) or wireless, as long as they are communicably connected. Real-time communication is not necessarily needed, and an arrangement may be made, for example, where the user terminal device 100 sequentially sends similarity search requests based on sensed information or the like to the data computation device 200, and multiple such requests may be sent in batch.

1.2 User Terminal Device

Figure 3:
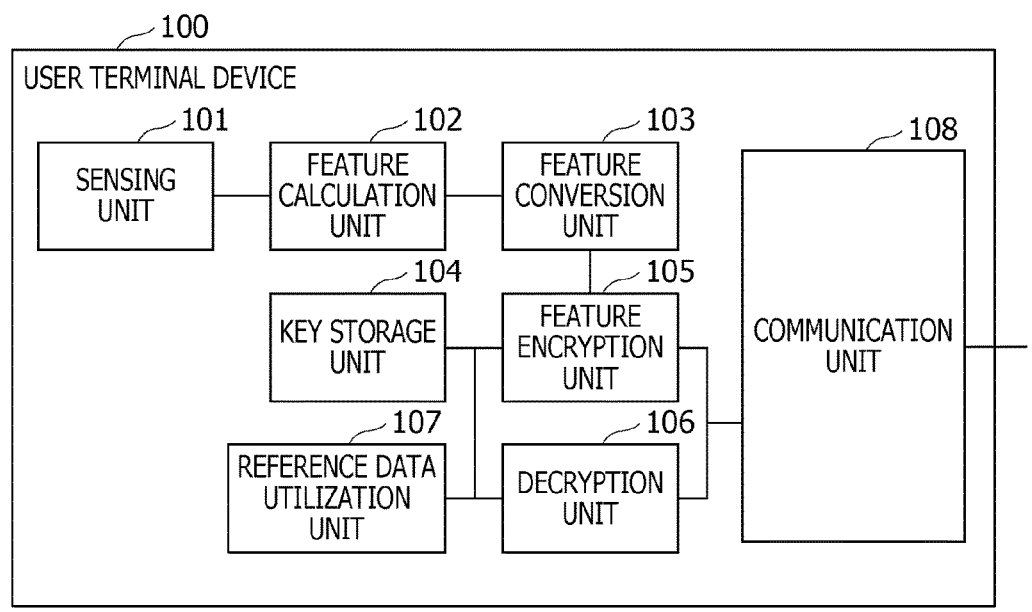
FIG. 3 is a configuration diagram illustrating the configuration of a user terminal device according to the first embodiment.

FIG. 3 is a configuration diagram illustrating the configuration of the user terminal device 100. The user terminal device 100 is configured including a sensing unit 101, a feature calculation unit 102, a feature conversion unit 103, a key storage unit 104, a feature encryption unit 105, a decryption unit 106, a reference data utilization unit 107, and a communication unit 108. The user terminal device 100 can be installed in a computer having a processor (microprocessor), memory, sensor, communication interface, and so forth, for example. Memory is read-only memory (ROM), random access memory (RAM), or the like, and can store programs (computer programs serving as software) executed by the processor. A computer program is a combination of multiple command codes giving instructions to a processor, to achieve a predetermined function. For example, the functions of the user terminal device 100 can be realized by a processor executing a program stored in memory. The user terminal device 100 senses information relating to the user, such as the blood pressure and pulse of the user, computed tomography (CT) scan information, and so forth, extracts features, requests the data computation device 200 for reference data (e.g., information of cases, etc.) similar to the features, and uses the acquired reference data for providing services to the user.

1.2.1 Sensing Unit

The sensing unit 101 senses information regarding the user. The sensing unit 101 may be configured including one or more sensors (measurement devices) for sensing, such as a sphygmomanometer, CT scanner, camera (image sensor), and so forth. Sensed information is vital data of the user such as blood pressure, body temperature, pulse, and so forth, for example. Sensed information may also be image information or the like, such as facial images, echo image, CT scan information, and so forth, obtained by imaging (measuring) the body of the user. Further, sensed information may be, for example, position information obtained by global positioning system (GPS), log information showing history of the user having operated electric equipment or a moving body (vehicle or the like), purchase history information of the user having purchased products, and so forth. Log information may be information where, for example, various types of information (displacement amount, speed, acceleration, etc.) and so forth acquired (measured) relating to vehicle steering operations, accelerator operations, brake operations, gearshift operations, and so forth, are correlated to the point-in-time of the operations.

Information relating to the user that has been sensed may be privacy data, which is personal matter that the user does not want others to know, for example. The search system 10 is a system capable of performing similarity searching while keeping privacy data secret, so description will be made assuming that information regarding the user that has been sensed by the sensing unit 101 is privacy data. The privacy data sensed by the sensing unit 101 is subjected to processing at various units on the user terminal device 100 and then encrypted by the feature encryption unit 105, and transmitted to the data computation device 200 for similarity searching.

1.2.2 Feature Calculation Unit

The feature calculation unit 102 calculates (extracts) features from the information (privacy data) acquired at the sensing unit 101 Features calculated by the feature calculation unit 102 may be expressed as vectors including multiple components (elements). The features include, for example, a component indicating an index relating to at least one of shape, size, weight, state, and movement, of all or one part of the body of the user. The part of the body that is the object of features may be any part, including for example, eye, nose, ear, hand, foot, organ, blood vessel, etc. Examples of the state regarding all or one part of the body of the user include health state (state of various types of examination items used in health diagnosis), body water content, blood pressure, oxygen saturation, and so forth. Examples of movement of all or one part of the body of the user include body movement (e.g., number of times turning over in sleep per unit time), slight body movements (pulse, respiration rate, inspiratory-to-expiratory time ratio, etc.). Examples of features include information of primary characteristic parameters in a facial image of the user, information of a position, area, or width of a certain region, or the like. Features may also be information represented by vectors, including as the components thereof, a coefficient of each term in a polynomial expression that expresses a trend on a temporal axis of an element regarding the user that has been measured by the sensing unit 101, based on history information of the element. The features themselves, extracted from information acquired by the sensing unit 101, may be privacy data.

1.2.3 Feature Conversion Unit

Figure 4:
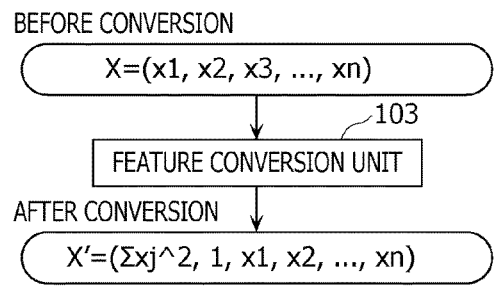
FIG. 4 is a diagram illustrating an example of conversion of features at the user terminal device according to the first embodiment.

The feature conversion unit 103 subjects the features calculated by the feature calculation unit 102 to predetermined conversion (referred to as "first conversion".) FIG. 4 illustrates an example of this first conversion, showing an example of features before conversion and after conversion. In a case where the features calculated by the feature calculation unit 102 (features before conversion) are expressed by n-dimensional vector X=(x1, x2, x3, Xn) (where n is 2 or larger, for example), the features after conversion by the feature conversion unit 103 (first converted features) are vector X'=($\Sigma xj^2$, 1, x1, x2, x3, Xn). The ($\Sigma xj^2$ here means the summation of $xj^2$ from 1 through n for j (i.e., the summation of the squares of the elements from x1 through xn).

1.2.4 Key Storage Unit

The key storage unit 104 stores keys to be used for encryption processes (encryption and decryption) at the feature encryption unit 105 and decryption unit 106. The encryption systems and keys used at the feature encryption unit 105 and decryption unit 106 may be the same or may be different. For example, an arrangement may be made where a key used at the feature encryption unit 105 is a secret key of the inner product encryption that enables inner product computation while kept encrypted, and a key used at the decryption unit 106 may be a secret key of the user terminal device 100 in a common public key encryption system (a secret key that forms a pair with a public key shared with the data computation device 200). Alternatively, the same secret key used at the feature encryption unit 105 may be used at the decryption unit 106.

1.2.5 Feature Encryption Unit

The feature encryption unit 105 encrypts the features converted by the feature conversion unit 103 according to a predetermined encryption system. The feature encryption unit 105 uses a key stored in the key storage unit 104 for this encryption. The feature encryption unit 105 performs encryption using predetermined inner product encryption that enables computation (inner product computation) for similarity searching at the data computation device 200 while keeping the features encrypted. The conventional method described in BISHOP referenced in the present specification is used for inner product encryption here, so the method will not be described here in detail.

1.2.6 Decryption Unit

The decryption unit 106 decrypts encoded reference data sent from the data computation device 200 (the results of similarity searching). The decryption unit 106 uses a key stored in the key storage unit 104 for this decryption.

1.2.7 Reference Data Utilization Unit

The reference data utilization unit 107 uses reference data acquired by decryption at the decryption unit 106. Usage of the reference data is, for example presentation of the reference data to the user. The reference data utilization unit 107 may include, for example, a display, an audio output device, or other user interfaces. Examples of presentation of reference data include displaying on a display of the user terminal device 100 in a format such as graphs, statistical information, or the like, based on the reference data, outputting audio based on the reference data from an audio output device, and so forth. The reference data utilization unit 107 may performed predetermined computation or information searching or the like based on the reference data, and thereby present the user with advice regarding improving lifestyle habits, advice regarding recommended diet, and so forth.

1.2.8 Communication Unit

The communication unit 108 performs communication with the data computation device 200. Encrypted communication by the transport layer security (TLS) protocol, for example, is used for this communication. The user terminal device 100 uses the communication unit 108 to perform mutual authentication with the data computation device 200 by TLS, and encrypts data. The communication unit 108 stores the public key certificate and secret key used in TLS.

The communication unit 108 transmits to the data computation device 200 a request for a similarity search accompanied by converted features encrypted by the feature encryption unit 105. The communication unit 108 also receives and transmits to the decryption unit 106 the encrypted reference data (results of the similarity search), which is the reply (response) from the data computation device 200 as to the request for the similarity search.

1.3 Data Computation Device

Figure 5:
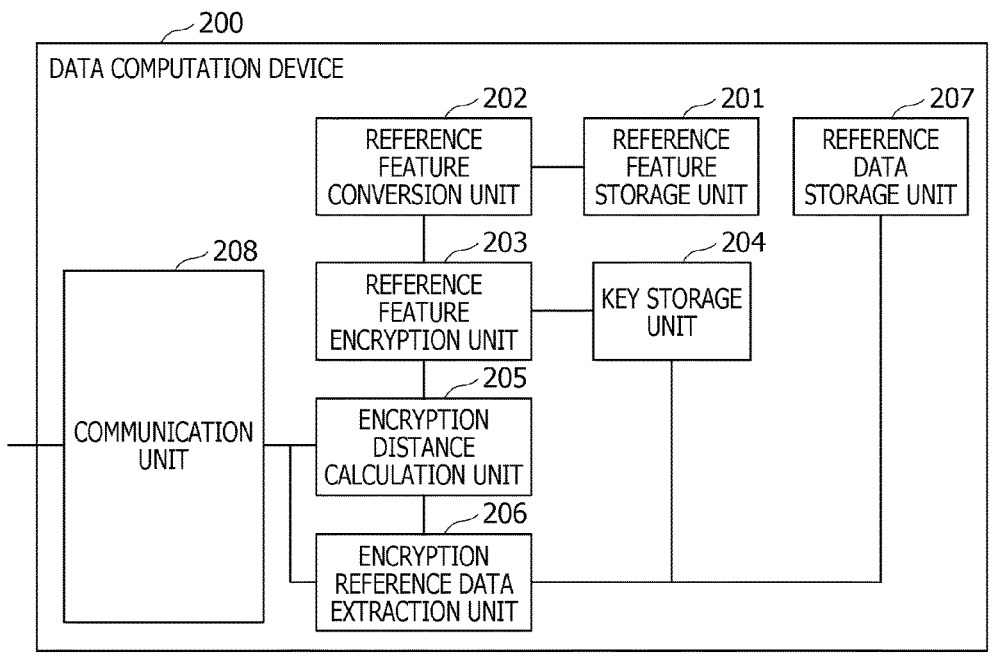
FIG. 5 is a configuration diagram illustrating the configuration of a data computation device according to the first embodiment.

FIG. 5 is a configuration diagram illustrating the configuration of the data computation device 200. The data computation device 200 includes a reference feature storage unit 201, a reference feature conversion unit 202, a reference feature encryption unit 203, a key storage unit 204, an encryption distance calculation unit 205, an encryption reference data extraction unit 206, a reference data storage unit 207, and a communication unit 208. In the same way as the user terminal device 100, the data computation device 200 can be installed in a computer having a processor, memory, communication interface, and so forth, for example. For example, the functions of the user data computation device 200 can be realized by a processor executing a program stored in memory. The data computation device 200 functions as a server performing similarity searching, receives a request for a similarity search for features from the user terminal device 100 (a request accompanied by converted and encrypted features), and transmits reference data which is the search results, to the user terminal device 100 as a response to the request. Similarity searching includes, for example, selecting reference features that have characteristics similar to the features, from a group of reference features extracted from information, such as vital data and so forth of multiple people other than the user, that is comparable to the features, and may include identifying reference data corresponding to the reference features (e.g., information of cases of people corresponding to the reference features, and so forth).

1.3.1 Reference Feature Storage Unit

The reference feature storage unit 201 stores reference features that are the object of searching when a similarity search is performed in response to a request from the user terminal device 100. The reference features may have a nature of being capable of comparison with the features in the information (information where features have been converted and encrypted) accompanying the request from the user terminal device 100. That is to say, the reference features are expressed in n-dimensional vectors, in the same way as the features.

FIG. 6A illustrates reference features stored in the reference feature storage unit 201. The reference feature storage unit 201 stores each of multiple reference features correlated with identifiers (ID). In the example in FIG. 6A, the reference feature storage unit 201 stores an ID and reference features Ey for each ID. In this example, the multiple reference features are represented by k n-dimensional vectors Yk=(yk1, yk2, yk3, . . . , ykn) where k is each integer from 1 through the number of the multiple reference features. Each of the reference features have been extracted from information, such as measurement results or the like for each of multiple people, for example, and may include a component indicating an index relating to at least one of shape, size, weight, state, and movement, of all or one part of the body of the person measured. The ID may be an identifier distinguishing that person (a person relating to the reference features) from other people. The reference features may be stored in the reference feature storage unit 201 in an encrypted manner, and decoded only when being converted at the reference feature conversion unit 202. The IDs correlated with the reference features stored in the reference feature storage unit 201 correspond to IDs correlated with reference data sorted in the later-described reference data storage unit 207 (see FIG. 6B).

1.3.2 Reference Feature Conversion Unit

The reference feature conversion unit 202 subjects the reference features stored in the reference feature storage unit 201 to predetermined conversion (referred to as "second conversion". FIG. 7 illustrates an example of this second conversion, showing an example of features before conversion and after conversion. In a case where one of the reference features stored in the reference feature storage unit 201 (reference features before conversion) is expressed by n-dimensional vector Y1=(y11, y12, y13, . . . , y1n) having the same number of components as the features, the reference features (second converted features) after conversion by the reference feature conversion unit 202 are vector Y1'=(1, $\Sigma y1j^2$, −2y11, −2y12, −2y1n). The $\Sigma y1j^2$ here means the summation of $y1j^2$ from 1 through n for j (i.e., the summation of the squares of the elements from y1 through y1n). The reference feature conversion unit 202 performs the same conversion for the other reference features Yk (k=2, . . . , n).

That is to say, in a case where the multiple reference features stored in the reference feature storage unit 201 are represented by n-dimensional vectors Yk=(yk1, yk2, yk3, ykn) where k is each integer from 1 through the number of the multiple reference features, the second conversion performed by the reference feature conversion unit 202 is arranged to convert each of the multiple reference features into Yk'=(1, $\Sigma ykj^2$, −2yk1, −2yk2, −2ykn). The $\Sigma ykj^2$ here means the summation of $ykj^2$ from 1 through n for j. This second conversion is arranged to have a certain relationship with the first conversion that the features are subjected to a the user terminal device 100. Specifically, an arrangement is made such that the results of inner product computation (inner product value) between the encrypted first features, which are the result of subjecting the first converted features obtained as the result of performing first conversion on the features to encryption by the above-described predetermined inner product encryption, and the encrypted second features, which are the result of subjecting the second converted features obtained as the result of performing second conversion on the reference features to encryption by the predetermined inner product encryption, is the Euclidean distance between the features and the reference features.

1.3.3 Reference Feature Encryption Unit

The reference feature encryption unit 203 subjects the reference features converted by the reference feature conversion unit 202 by a predetermined encryption system. The reference feature encryption unit 203 uses a key stored in the key storage unit 204 for this encryption. The reference feature encryption unit 203 uses the same inner production encryption as the feature encryption unit 105 of the user terminal device 100 to encrypt each of the multiple reference features (second converted features) converted by the reference feature conversion unit 202.

1.3.4 Key Storage Unit

The key storage unit 204 stores keys to be used for encryption processes (encryption and decryption) at the reference feature encryption unit 203 and encryption reference data extraction unit 206. The encryption systems and keys used at the reference feature encryption unit 203 and encryption reference data extraction unit 206 may be the same or may be different. For example, an arrangement may be made where a key used at the reference feature encryption unit 203 is a secret key of the inner product encryption that enables inner product computation while kept encrypted, and a key used at the encryption reference data extraction unit 206 may be a public key of the user terminal device 100 in a common public key encryption system. The same secret key used by the reference feature encryption unit 203 may be used by the encryption reference data extraction unit 206.

1.3.5 Encryption Distance Calculation Unit

The encryption distance calculation unit 205 acquires information relating to the request for the similarity search that the user terminal device 100 has transmitted (the encrypted first converted features that are the features subjected to the first conversion and encryption by inner product encryption) via the communication unit 208. The encryption distance calculation unit 205 also acquires the encrypted second converted features that are the second converted features based on the reference features that have been encrypted by the reference feature encryption unit 203.

The encryption distance calculation unit 205 obtains the Euclidean distance between the features generated by the user terminal device 100 and the reference features stored in the data computation device 200 by inner product computation, with each kept encrypted.

For example, the Euclidean distance D1 between feature vector X=(x1, x2, x3, xn) and one reference feature vector Y1=(y1, y1, y13, . . . , y1n) is expressed as D1=$\Sigma(xj-y1j)^2$ (j=1, . . . , n). $\Sigma(xj-y1j)^2$ represents the summation from the results of x1-y11 squared through the results of xn-y1n squared. Although the definition of the Euclidean distance generally is the square root of D1, description will be made here with D1 (the correct term is "squared Euclidean distance") as the Euclidean distance. The inner product encryption described in BISHOP yields the inner product value <X, Y1>=$\Sigma xi \cdot y1i$ (i=1, . . . , n) for the two vectors X and Y1, while kept encrypted. Computing the inner product of the features converted by the first conversion (first converted features) X'=($\Sigma xj^2$, 1, x1, x2, x3, Xn) and the reference features converted by the second conversion (second converted features) Y1'=(1, $\Sigma y1j^2$, −2y11, −2y12, −2y1n) by the inner product encryption described in BISHOP yields the following.

$$<X', Y1'> = \Sigma xj^2 + \Sigma y1j^2 - 2x1 \cdot y11 - 2x2 \cdot y12 - \ldots - 2xn \cdot y1n$$
$$= \Sigma(xj - y1j)^2$$

This, performing inner product computation between the features converted by the first conversion and the reference features converted by the second conversion yields the Euclidean distance between the features and reference features. Using inner product encryption described in BISHOP enables the encrypted Euclidean distance to be obtained by inner product computation, and Euclidean distance to be obtained by decrypting.

The encryption distance calculation unit 205 determines whether similar or not according to whether or not the Euclidean distance obtained by inner product computation (the results of inner product computation) satisfies a certain condition. This certain condition is a condition that the obtained value is no larger than a predetermined threshold (e.g., 1 or the like). In a case that the determination is that the two are similar, the encryption distance calculation unit 205 extracts the ID correlated with the corresponding reference features (i.e., the reference features serving as the basis for the encrypted second converted features used for the inner product computation to determine whether or not the certain conditions are satisfied). In a case where the determination is that the two are not similar, the encryption distance calculation unit 205 does not extract the ID of the corresponding reference features.

The encryption distance calculation unit 205 performs inner product computation regarding the multiple encrypted second converted features obtained by subjecting each of the multiple reference features stored in the reference feature storage unit 201 to second conversion and inner product encryption, using the encrypted second converted features and encrypted first converted features obtained by subjecting the features received from the user terminal device 100 to first conversion and inner product encryption, and determines whether or not the above-described certain condition is satisfied. Thus, IDs corresponding to one or more of the multiple reference features stored in the reference feature storage unit 201 satisfying the certain condition relating to similarity determination are extracted.

1.3.6 Encryption Reference Data Extraction Unit

The encryption reference data extraction unit 206 extracts reference data corresponding to the one or more IDs extracted by the encryption distance calculation unit 205 from the reference data storage unit 207 and performs encryption thereupon, and transmits the encrypted reference data to the user terminal device 100 via the communication unit 208. Note that the encryption reference data extraction unit 206 may anonymize the reference data (e.g., case information or the like) before encryption, so that the corresponding person cannot be identified. The encryption reference data extraction unit 206 may also obtain statistical information such as averages, distribution, and so forth, regarding the one or more sets of extracted data corresponding to the IDs, and encrypted and transmit this to the user terminal device 100.

1.3.7 Reference Data Storage Unit

The reference data storage unit 207 stores multiple sets of reference data corresponding to the multiple reference features that are the object of searching, when performing similarity searching in accordance with a request from the user terminal device 100. For example, reference data corresponding to reference features extracted from information such as measurement results or the like, regarding a certain person, relate to information of that person. FIG. 6B illustrates an example of reference data stored in the reference data storage unit 207. The reference data storage unit 207 stores multiple sets of reference data, each correlated with an identifier (ID). The reference features and reference data are correlated by IDs. The reference data storage unit 207 stores an ID and reference data Ez for each ID in the example in FIG. 6B. Each set of reference data may have been extracted from information such as measurement results or the like from each of multiple people. For example, in a case where the reference features are indices regarding the body of a person (e.g., blood pressure, pulse, etc.), the reference data may be history of illness and treatment or the like of that person. In a case where the reference features are location information of that person, the reference data may be history of products purchased by that person, or the like. In the example in FIG. 6B, history of illness is stored, such as the person with ID 1 was hospitalized due to a stroke in October 2013, the person with ID 2 started treatment for diabetes in February 1999, and so on. The reference data may be encrypted and stored in the reference data storage unit 207.

The reference data storage unit 207 and reference feature storage unit 201 are realized as storage media such as memory, hard disks, and so forth in the data computation device 200 for example. Multiple sets of reference data and multiple reference features are sorted in a correlated manner in the storage media.

1.3.8 Communication Unit

The communication unit 208 communicates with the user terminal device 100. Encrypted communication by the TLS protocol, for example, is used for this communication. The data computation device 200 uses the communication unit 208 to perform mutual authentication with the user terminal device 100 by TLS, and encrypts data. The communication unit 208 stores the public key certificate and secret key used in TLS.

The communication unit 208 receives requests for similarity searches from the user terminal device 100 accompanied by encrypted features, and transmits the information thereof to the encryption distance calculation unit 205. The communication unit 208 also transmits reference data encrypted at the encryption reference data extraction unit 206 to the user terminal device 100 as replies (responses) to requests for similarity searches.

1.4 Operations of Search System

FIG. 8 is a sequence diagram illustrating operations of the search system 10. Operations of the search system 10 will be described below with reference to FIG. 8.

The data computation device 200 converts each of the reference features Yk stored in the reference feature storage unit 201 at the reference feature conversion unit 202 (step S101). Accordingly, each of the reference features Yk are converted by the second conversion, thereby generating multiple second reference features Yk'.

Next, the data computation device 200 encrypts each of the reference features converted by the reference feature conversion unit 202 at the reference feature encryption unit 203 (step S102). Accordingly, each of the second converted features are encrypted by predetermined inner product encryption, and multiple encrypted reference features (encrypted second converted features) are generated.

The user terminal device 100 acquires information (privacy data of the user) at the sensing unit 101 (step S103).

The user terminal device 100 then uses the feature calculation unit 102 to calculate (extracts) features X from the information acquired at the sensing unit 101 (step S104).

Next, the user terminal device 100 converts the features X at the feature conversion unit 103 (step S105). Accordingly, the features X are converted by the first conversion, thereby generating first converted features X'.

The user terminal device 100 then encrypts the converted features (first converted features X') at the feature encryption unit 105 (step S106). The first converted features are thus encrypted by inner produce encryption, thereby generating encrypted features (encrypted first converted features).

The user terminal device 100 transmits the encrypted features to the data computation device 200 using the communication unit 108, and requests similar data satisfying the certain condition (step S107). The similar data is data (reference data) regarding other people that is similar to the features of the user. Thus, the encrypted features (encrypted first converted features) are transmitted from the user terminal device 100 to the data computation device 200.

Next, the data computation device 200 selects, from the multiple encrypted reference features generated in step S102, the encrypted reference features corresponding to the i'th ID (step S108). Here, the initial value of i is 1, for example, with i being incremented by 1 each time step S108 is repeated until the number of encrypted reference features generated in step S102 is reached (i.e., the total number of reference features or IDs).

The data computation device 200 calculates the inner product by inner product computation using the encrypted reference features selected in step S108 (encrypted second converted features) and the encrypted features received from the user terminal device 100 (encrypted first converted features) at the encryption distance calculation unit 205 (step S109). The result of this calculation yields the Euclidean distance between the features and the reference features corresponding to the i'th ID.

The encryption distance calculation unit 205 of the data computation device 200 checks (determines) whether or not the certain condition is satisfied by whether or not the Euclidean distance derived by the calculation in step S109 is no larger than a predetermined threshold value (step S110). In a case where the Euclidean distance is no larger than the predetermined threshold value in step S110, the encryption distance calculation unit 205 determines that the features and reference features are similar, and extracts the i'th ID (step S111).

The data computation device 200 repeats the processing of steps S108 through S111 until checking of all IDs has ended, and thereafter uses the encryption reference data extraction unit 206 to extract, from the reference data storage unit 207, reference data corresponding to each of the one or more IDs extracted in step S111, and to encrypt the extracted reference data (step S112).

The data computation device 200 then transmits the reference data encrypted in step S122 via the communication unit 208 (step S113). Accordingly, information representing one or more reference data sets is transmitted to the user terminal device 100.

The user terminal device 100 that has received the encrypted reference data decrypts the encrypted reference data, decrypts the reference data at the decryption unit 106, and uses the reference data at the reference data utilization unit 107 (step S114).

1.4.2 Communication Between User Terminal Device and Data Computation Device

FIGS. 9A and 9B illustrate examples of the format of communication data exchanged between the user terminal device 100 and the data computation device 200 in steps S107 and S113, respectively. The communication data relating to the examples in FIGS. 9A and 9B is all configured including transmitting party, receiving party, command, and data. The transmitting party is identification information (communication network address or the like) of the originator of the communication data, and the receiving part is identification information (communication network address or the like) of the transmission target (recipient) of the communication data. FIG. 9A illustrates an example where communication data transmitted from the user terminal device 100 in step S107 includes information indicating a request command for similar data, as the command, and includes encrypted features (encrypted first converted features) as data. FIG. 9B illustrates an example where communication data transmitted from the data computation device 200 in step S113 includes information indicating a reply command for similar data, as the command, and includes two sets of encrypted reference data as the data.

In a case where the user terminal device 100 and data computation device 200 are capable of executing multiple processes according to the sequence illustrated in FIG. 8 in parallel, identifiers may be included in the communication data, to identify corresponding communication data between step S107 and step S113. In this case, the identifier is set to the same value in the communication data including a reply command as that in the communication data including the request command to which the reply is being made. This also is true in cases where communication data is exchanged in parallel between multiple user terminal devices and multiple data computation devices; identifiers may be included in the communication data, to identify corresponding communication data between step S107 and step S113.

1.5 Advantages of First Embodiment

In the search system 10 according to the first embodiment, the data computation device 200 receives information including encrypted features (encrypted first converted features) where features have been subjected to first conversion and encrypted by inner product encryption at the user terminal device 100, and uses encrypted reference features obtained by subjecting reference features stored therein to second conversion and encryption by inner product encryption (encrypted second converted features) to derive the Euclidean distance between the features and each of the reference features by inner product computation while kept encrypted, thereby extracting similar data (reference data corresponding to similar reference features). Only reference data corresponding to similar reference features where the Euclidean distance is no larger than a predetermined threshold value is extracted and sent to the user terminal device 100, so the amount of processing at the user terminal device 100 (amount of calculation) and the amount of communication can be reduced as compared to a case of similarity searching using conventional homomorphic encryption. The feature data, which may be privacy data of the user, is not handled as plaintext in the data computation device 200, so privacy of the user can be protected.

Second Embodiment

A search system 11, which is an example of partially modifying the search system 10 according to the first embodiment and separating the data computation device 200 into two devices, will be described below.

2.1 Overall Configuration of Search System

Figure 10:
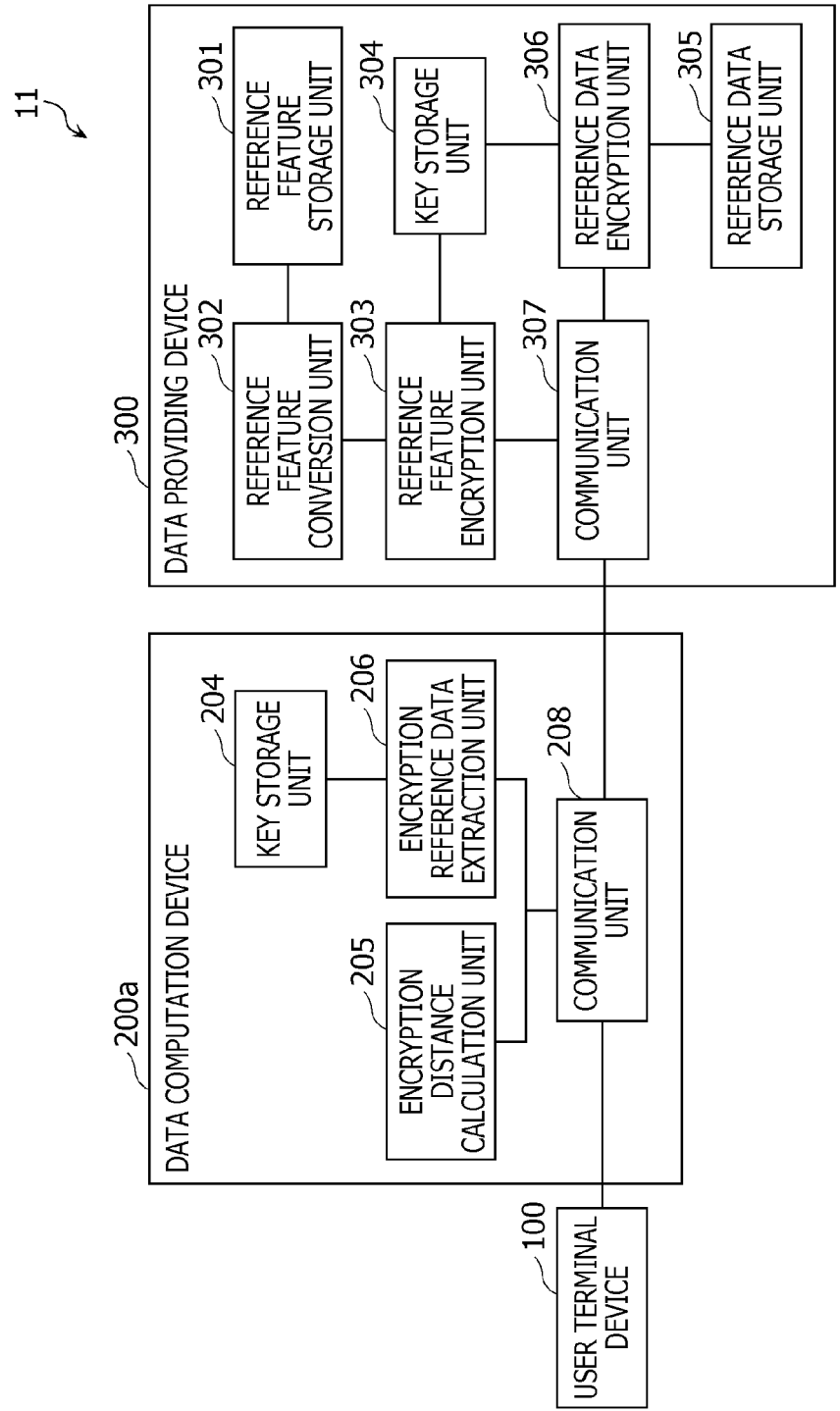
FIG. 10 is a configuration diagram illustrating the entirety of a search system according to a second embodiment.

FIG. 10 is a configuration diagram illustrating the overall configuration of the search system 11 according to a second embodiment. The search system 11 includes the user terminal device 100, a data computation device 200a, and a data providing device 300. That is to say, in the search system 11, the data computation device 200 in the search system 10 according to the first embodiment has been divided into the data computation device 200a and data providing device 300. The data providing device 300 encrypts the reference features and reference data, and provides to the data computation device 200a. None of features, reference features, and reference data is handled as plaintext at the data computation device 200a. Note that components that are the same as those in the search system 10 (see FIGS. 2, 3, and 5) are denoted by the same reference numerals, and description will be omitted as appropriate. Any points of the search system 11 that are not mentioned in particular here are the same as in the search system 10.

Although FIG. 10 illustrates an arrangement where there is one each of the user terminal device 100, data computation device 200a, and data providing device 300, but this is not restrictive, and it is sufficient to have one or more of each, so there may be multiple of each. The connections among the devices may be cabled connections or wireless connections.

2.2 Data Computation Device

The data computation device 200a is configured the key storage unit 204, encryption distance calculation unit 205, encryption reference data extraction unit 206, and communication unit 208, as illustrated in FIG. 10. The data computation device 200a can be installed in a computer having a processor, memory, communication interface, and so forth, for example. For example, the functions of the data computation device 200a can be realized by a processor executing a program stored in memory or the like. The data computation device 200a receives a request for a similarity search for features from the user terminal device 100 (a request accompanied by information of converted and encrypted features), acquires encrypted reference features from the data providing device 300 and performs similarity searching, and transmits encrypted reference data which is the search results acquired from the data providing device 300, to the user terminal device 100 as a response to the request.

The key storage unit 204 stores the key that the encryption reference data extraction unit 206 uses in encryption processing. The key that the encryption reference data extraction unit 206 uses to encrypt the reference data received from the data providing device 300 for transmission to the user terminal device 100 is, for example, a public key of the user terminal device 100 in a common public key encryption system, or the like.

The encryption distance calculation unit 205 acquires information relating to the request for the similarity search that the user terminal device 100 has transmitted (the encrypted first converted features or the like that are the features subjected to the first conversion and encryption by inner product encryption) via the communication unit 208. The encryption distance calculation unit 205 also requests and acquires the encrypted second converted features that are the second converted features based on the reference features that have been encrypted by a reference feature encryption unit 303 of the data providing device 300. The encryption distance calculation unit 205 obtains the Euclidean distance between the features generated by the user terminal device 100 and the reference features stored in the data providing device 300 by inner product computation, with each kept encrypted.

The encryption reference data extraction unit 206 acquires reference data corresponding to the one or more IDs extracted by the encryption distance calculation unit 205 from the data providing device 300 via the communication unit 208, and transmits the reference data acquired from the data providing device 300 to the user terminal device 100 via the communication unit 208. The encryption reference data extraction unit 206 may encrypt the reference data when transmitting the reference data to the user terminal device 100. Note also that the data providing device 300 may encrypt the reference data using the public key of the user terminal device 100 or the like and transmit the encrypted reference data. In this case, the encryption reference data extraction unit 206 omits the encryption, and transfers the reference data received from the data providing device 300 to the user terminal device 100.

In addition to communicating with the user terminal device 100, the communication unit 208 also communicates with the data providing device 300. Encrypted communication by the TLS protocol, for example, is used for this communication. The data computation device 200a performs mutual authentication with the user terminal device 100 and data providing device 300 based on TLS, and encrypts data. The communication unit 208 stores the public key certificate and secret key used in TLS.

2.3 Data Providing Device

The data providing device 300 can be installed in a computer having a processor, memory, communication interface, and so forth, for example. For example, the functions of the data providing device 300 can be realized by a processor executing a program stored in memory or the like. Upon being requested for multiple encrypted reference features (encrypted second converted features) from the data computation device 200a, the data providing device 300 transmits each with an ID to the data computation device 200a, and also in a case of being requested for reference data from the data computation device 200a with an ID specified, transmits the reference data to the data computation device 200a.

As illustrated in FIG. 10, the data providing device 300 is configured including a reference feature storage unit 301, a reference feature conversion unit 302, the reference feature encryption unit 303, a key storage unit 304, a reference data storage unit 305, a reference data encryption unit 306, and a communication unit 307. The reference feature storage unit 301, reference feature conversion unit 302, reference feature encryption unit 303, and reference data storage unit 305 have the same functions as the reference feature storage unit 201, reference feature conversion unit 202, reference feature encryption unit 203, and reference data storage unit 207 described in the first embodiment, so description will be omitted here.

The key storage unit 304 stores a key to be used for encryption of converted reference features at the reference feature encryption unit 303 and a key to be used for encryption of reference data at the reference data encryption unit 306. The public key or the like of the user terminal device 100, for example, may be used for encryption of reference data, or a secret key or the like shared between the data providing device 300 and the data computation device 200a may be used.

The reference data encryption unit 306 encrypts reference data stored in the reference data storage unit 305 that the data computation device 200a requests by specifying an ID, and transmits the encrypted reference data to the data computation device 200a via the communication unit 307. The communication unit 307 communicates with the user data computation device 200a. Encrypted communication by the TLS protocol, for example, is used for this communication. The data providing device 300 uses the communication unit 307 to perform mutual authentication with the data computation device 200a by TLS, and encrypts data. The communication unit 307 stores the public key certificate and secret key used in TLS.

2.4 Operations of Search System 2.4.1 Operation Processing

Figure 11:
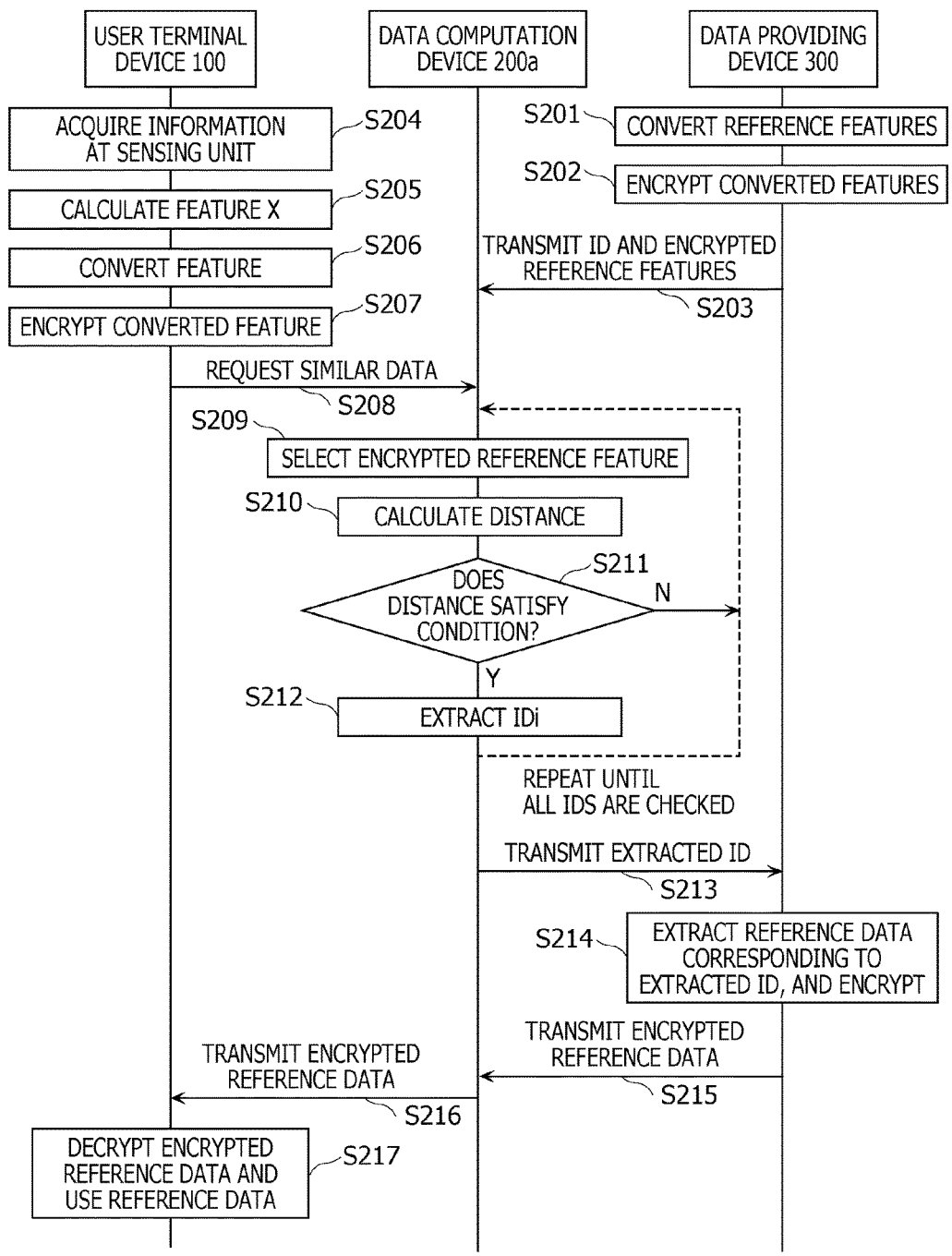
FIG. 11 is a sequence diagram illustrating operations of the search system according to the second embodiment.

FIG. 11 is a sequence diagram illustrating operations of the search system 11. Operations of the search system 11 will be described below with reference to FIG. 11.

The data providing device 300 converts each of the reference features $Y_k$ stored in the reference feature storage unit 301 at the reference feature conversion unit 302 (step S201). Accordingly, each of the reference features Yk are converted by the second conversion, thereby generating multiple second converted features Yk'.

Next, the data providing device 300 encrypts each of the reference features converted by the reference feature conversion unit 302 at the reference feature encryption unit 303 (step S202). Accordingly, each of the second converted features are encrypted by predetermined inner product encryption, and multiple encrypted reference features (encrypted second converted features) are generated.

The data providing device 300 transmits multiple encrypted reference features to the data computation device 200a in a manner correlated with relevant IDs, in response to a request from the data computation device 200a, for example (step S203). The data computation device 200a acquires the multiple encrypted reference features (encrypted second converted features) by reception.

The user terminal device 100 acquires information (privacy data of the user) at the sensing unit 101 (step S204).

The user terminal device 100 then uses the feature calculation unit 102 to calculate (extract) features X from the information acquired at the sensing unit 101 (step S205).

Next, the user terminal device 100 converts the features X at the feature conversion unit 103 (step S206). Accordingly, the features X are converted by the first conversion, thereby generating first converted features X'.

The user terminal device 100 then encrypts the converted features (first converted features X') at the feature encryption unit 105 (step S207). The first converted features are thus encrypted by inner product encryption, thereby generating encrypted features (encrypted first converted features).

Then, the user terminal device 100 transmits the encrypted features to the data computation device 200a via the communication unit 108, and requests similar data satisfying the certain condition (step S208). The similar data is data (reference data) regarding other people that is similar to the features of the user, for example. Thus, the encrypted features (encrypted first converted features) are transmitted from the user terminal device 100 to the data computation device 200a.

Next, the data computation device 200a selects the encrypted reference features corresponding to the i'th ID of the multiple encrypted reference features acquired from the data providing device 300 (step S209). Here, the initial value of i is 1, for example, with i being incremented by 1 each time step S209 is repeated until the number of encrypted reference features generated in step S202 is reached (i.e., the total number of reference features or IDs).

The data computation device 200a calculates the inner product by inner product computation using the encrypted reference features selected in step S209 (encrypted second converted features) and the encrypted features received from the user terminal device 100 (encrypted first converted features) at the encryption distance calculation unit 205 (step S210). The result of this calculation yields the Euclidean distance between the features and the reference features corresponding to the i'th ID.

The encryption distance calculation unit 205 of the data computation device 200a checks (determines) whether or not the certain condition is satisfied by whether or not the Euclidean distance derived by the calculation in step S210 is no larger than a predetermined threshold value relating to similarity (step S211). In a case where the Euclidean distance is no larger than the predetermined threshold value in step S211, the encryption distance calculation unit 205 determines that the features and reference features are similar, and extracts the i'th ID (step S212).

The data computation device 200a repeats the processing of steps S209 through S212 until checking of all IDs has ended, and transmits a request for reference data specified by the one or more IDs extracted in step S212 to the data providing device 300 (step S213).

The data providing device 300 that has received the request for reference data extracts, from the reference data storage unit 305, reference data corresponding to each of the one of more IDs received from the data computation device 200a, and encrypts the extracted reference data at the reference data encryption unit 306 (step S214).

The data providing device 300 then transmits the reference data encrypted by the reference data encryption unit 306 to the data computation device 200a via the communication unit 307 (step S215).

The data computation device 200 then transmits the encrypted reference data received from the data providing device 300 to the user terminal device 100 (step S216). In a case where the reference data received from the data providing device 300 has been encrypted by the public key of the user terminal device 100 or the like, in step S216 the data computation device 200a may transmit the encrypted reference data received from the data providing device 300 to the user terminal device 100 without any change. Alternatively, the encrypted reference data received from the data providing device 300 may be decrypted and then encrypted by the public key of the user terminal device 100 or the like and transmitted to the user terminal device 100.

The user terminal device 100 that has received the transmitted encrypted reference data decrypts the reference data at the decryption unit 106, and uses the reference data at the reference data utilization unit 107 (step S217).

2.5 Advantages of Second Embodiment

In the search system 11 according to the second embodiment, the data computation device 200a receives information including encrypted features (encrypted first converted features) where features have been subjected to first conversion and encrypted by inner product encryption at the user terminal device 100, receives from the data providing device 300 encrypted reference features obtained by subjecting reference features stored therein to second conversion and encryption by inner product encryption (encrypted second converted features), and performs inner product computation thereof while kept encrypted to derive the Euclidean distance between the features and each of the reference features, thereby extracting similar data (reference data corresponding to similar reference features). The data computation device 200a does not use plaintext regarding the features of the user terminal device 100 and the reference features of the data providing device 300, so privacy can be protected. Only reference data corresponding to similar reference features where the Euclidean distance is no larger than a predetermined threshold value is received from the data providing device 300 at the data computation device 200a and sent to the user terminal device 100, so the processing load at the user terminal device 100 (amount of calculation) and the amount of communication can be reduced.

Other Embodiments

The first and second embodiments have been described above as examples of technology relating to the present disclosure. It is needless to say, though that the above embodiments are only exemplary, and that various modifications, additions, and omissions may be made. Modifications and the like will be described below.

Figure 12:
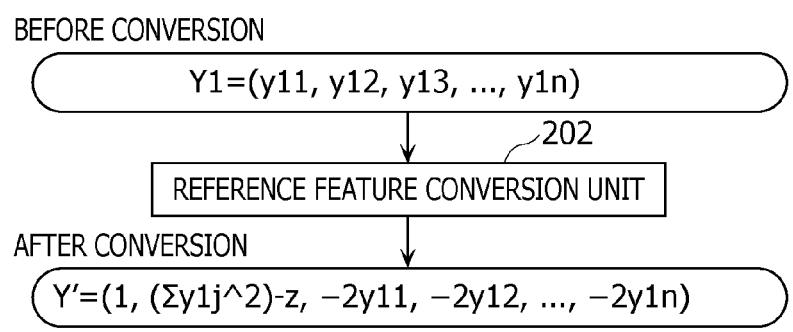
FIG. 12 is a diagram illustrating an example of conversion of reference features according to a first modification.

(1) Although an example has been described above where the inner product encryption described in BISHOP is used for encryption of the first converted features that are converted features and encryption of the second converted features that are converted reference features, predetermined predicate encryption, which is an encryption system described in SHEN, may be used for this encryption. Hereinafter, an example where this predetermined predicate encryption is used will be referred to as "first modification". FIG. 12 illustrates an example of conversion of reference features at the reference feature conversion unit 202 in the search system 10 according to the first modification, illustrating an example of reference features before and after conversion. In an example where one of the reference features stored in the reference feature storage unit 201 (reference features before conversion) is expressed as an n-dimensional vector Y1=(y11, y12, y13, ..., y1n) consisting of the same number of components as the features, the reference features after conversion by the reference feature conversion unit 202 is vector Y1'=(1, ($\Sigma$y1j$^2$)−z, −2y11, −2y12, ..., −2y1n). The $\Sigma$y1j$^2$ means the summation of y1j$^2$ from 1 through n for j (i.e., the summation of the squares of the elements from y11 through y1n). The z represents variable relating to conditions for the Euclidean distance, and if the threshold value for Euclidean distance to determine similarity (the threshold value for determining a relationship where the Euclidean distance is the no greater than the threshold value to be similar) is set to D−1 for example, values from 0 through D−1 are substituted into z. Y1's corresponding to each substituted value, the number of which is D in this case, are used, and inner product computation is performed as to the vector X' of the first converted features that is the features after the first conversion, thereby determining whether similar or not. That is to say, inner product computation is performed by inputting, into Query described in SHEN, that which is obtained by subjecting to the predetermined predicate encryption the reference features Y1' after conversion using the predetermined z where one value from 0 through D−1 has been substituted, and that which is obtained by subjecting the features X' after conditions to the predetermined predicate encryption. In a case where the output of the Query described in SHEN is singular, the Euclidean distance between the features X and the reference features Y1 is the predetermined z, and so determination can be made that there is similarity. Determination of similarity is made for Y1 by performing similarity determination by Query for D times based on Y1' and X' generated by sequentially substituting values from 0 through D−1 into z. The reference feature conversion unit 202 preforms the same conversion regarding the other reference features (Yk (k=2, ..., n) as well. The data computation device 200 then performs similarity determination using the n−1 reference features after conversion from Y2 through Yn, in the same way as in the case of Y1. The first conversion performed by the feature conversion unit 103 of the user terminal device 100 and the second conversion performed by the reference feature conversion unit 202 of the data computation device 200 here, are set so that the result of inner product computation of the encrypted first converted features that are the first converted features subjected to predetermined predicate encryption, and the encrypted second converted features that are the second converted features subjected to predetermined predicate encryption, are a value obtained by subtracting the predetermined value z from the Euclidean distance between the features corresponding to the encrypted first converted features and the reference features corresponding to the encrypted second converted features. The certain condition for determining similarity in this case is a condition satisfied in a case where the result of the inner product computation is 0.

(2) Although the above-described embodiments have been described by way of an example of first conversion by the feature conversion unit 103 and second conversion by the reference feature conversion unit 202, the first and second conversion may be such that <X', Y1'> is as shown in the following Expression, for example.

$$<X', Y1'> = \Sigma xj^2 + \Sigma y1j^2 - 2x1 \cdot y11 - 2x2 \cdot y12 - \ldots - 2xn \cdot y1n$$
$$= \Sigma(xj - y1j)^2$$

As for a specific conversion method, features X may be converted by the first conversion so that X'=($\Sigma$xj$^2$, 1, −2x1, −2x2, ..., −2xn), and Y1 that is one of the reference features be converted by the second conversion so that Y1'=(1, $\Sigma$y1j$^2$, y11, y12, ..., y1n). In the case of applying to the first modification, the features X may be converted by the first conversion so that X'=($\Sigma$xj$^2$, 1, −2x1, −2x2, −2xn), and Y1 that is one of the reference features be converted by the second conversion so that Y1'=(1, ($\Sigma$y1j$^2$)−z, y11, y12, ..., y1n).

Although Euclidean distance that is not weighted in particular has been obtained in the above embodiments, the Euclidean distance may be a weighted Euclidean distance. For example, the Euclidean distance is a weighted Euclidean distance that has been weighted from w1 through wn corresponding to the 1st through n'th components of the n-dimensional vector. In a case of obtaining a weighted Euclidean distance, In a case where wj represents weighting of each component (element) j of the vector, the first conversion by the feature conversion unit 103 is as follows. In a case where the features X are expressed by the n-dimensional vector X=(x1, x2, x3, ..., xn), the features X are vector X'=($\Sigma$(wj·xj$^2$), 1, x1, x2, ..., xn) as the first converted features, where $\Sigma$(wj·xj$^2$) is the summation of (wj·xj$^2$) from 1 through n for j. Also, the second conversion by the reference feature conversion unit 202 is as follows. In a case expressing as an n-dimensional vector Yk=(yk1, yk2, yk3, ykn) where k is integers from 1 to the number of reference features, the multiple reference features are each converted to vector Yk'=(1, $\Sigma$ (wj·ykj$^2$), −2w1·yk1, −2w2·yk2, −2wn·ykn) as second converted features, where $\Sigma$(wj·ykj$^2$) is the summation of (wj·ykj$^2$) from 1 through n for j. Conversion of one of the reference features Y1 is performed as Y1'=(1, $\Sigma$(wj·y1j$^2$), −2w1·y11, −2w2·y12, −2wn·y1n). <X', Yk'> is as is as shown in the following Expression.

$$<X', Yk'> = \Sigma(wj \cdot xj^2) + \Sigma(wj \cdot ykj^2) - 2w1 \cdot x1 \cdot yk1 -$$
$$2w2 \cdot x2 \cdot yk2 - \ldots - 2wn \cdot xn \cdot ykn$$
$$= \Sigma wj(xj - ykj)^2$$

(4) Although an example has been illustrated in the above embodiments where the Euclidean distance between features and reference features are calculated by performing conversion of features and reference features, at the feature conversion unit 103 and reference feature conversion unit 202, the exponential of difference between the features and reference features, serving as an extension of Euclidean distance, can be calculated by the following conversion method. For example, in a case of calculating $\Sigma\,(xj-y1j)^3$, The X' and Y1' after conversion are as shown in the following Expressions.

$$X'=(\Sigma xj^3, 1, x1^2, x1, x2^2, x2, \ldots, xn^2, xn)$$

$$Y1'=(1, \Sigma y1j^3, -3y11, 3y11^2, -3y12, 3y12^2, \ldots, -3y1n, 3y1n^2)$$

The $\Sigma xj^3$ is the summation of $(xj^3)$ from 1 through n for j. Here, $\langle X', Y1'\rangle$ matches $\Sigma\,(xj-y1j)^3$, so xj−y1j to the third power can be calculated. Conversion can be performed in the same to calculate powers other than the third power as well. A further extension of Euclidean distance can be calculated in the same way, by changing the exponent for each component (element) in a polynomial obtained by inner product computation between features and reference features, so that the first term is the second power, the second term is the third power, and so on.

(5) An example has been described in the above examples where the data computation device 200 or the data providing device 300 stores the reference features, and converts and encrypts these reference features. Alternatively, the data computation device 200 or data providing device 300 may store second converted features that are reference features converted beforehand, by storing in a storage medium or the like correlated with IDs (IDs for correlation with reference data), or encrypted reference features (encrypted second converted features) obtained by encrypting the second converted features may be stored correlated with IDs. This can enable processing relating to similarity searching to be performed efficiently.

(6) Although description has been made in the above embodiments that the data computation devices 200 and 200a perform determination regarding whether or not the Euclidean distance serving as the results of inner product computation satisfy a certain condition, for all encrypted reference features corresponding to all IDs (see FIGS. 8 and 11), an arrangement may be made where repetition of determination is quit at the point that a certain number (e.g., ten) have been determined to satisfy the condition. Alternatively, the data computation devices 200 and 200a may be arranged to transmit reference data corresponding to, of all reference features, just the certain number (e.g., ten) in the order of smallest Euclidean distance as to the features, to the user terminal device 100.

Also, in the case of using the first modification, an arrangement may be made where determination is made regarding whether or not there are reference features satisfying the condition at z=0, next determination is performed at z=1, and so on in order till the certain number (e.g., ten) have been found to satisfy the condition, at which point the repetition is ended. Accordingly, reference data corresponding to the certain number of reference features closest in Euclidean distance to the features can be provided to the user terminal device 100.

(7) Although description has been made in the above embodiments that the encryption reference data extraction unit 206 encrypts and transmits reference data, but the reference data does not necessarily have to be encrypted. It should be noted, however, that encryption is useful in keeping the reference data acquired by the user secret.

(8) Transmission of encrypted reference features from the data providing device 300 to the data computation device 200a in the above-described second embodiment may be performed in response from the data computation device 200a to the data providing device 300, or may be made autonomously by the data providing device 300 regardless of whether or not there has been a request. An arrangement also may be made where, after receiving a request from the user terminal device 100 regarding a similarity search, the data computation device 200a requests the data providing device 300 for transmission of the encrypted reference features, and the data providing device 300 transmits the encrypted reference features to the data computation device 200a in response to this.

(9) Description has been made in the first modification that, in an example where reference features before conversion are expressed as vector Y1 =(y11, y12, y13, . . . , y1n) using predicate encryption, the reference features after conversion by the reference feature conversion unit 202 are vector Y1'=(1, $(\Sigma y1j^2)$−z, −2y11, −2y12, . . . , −2y1n), but this is only an example. For example, an arrangement may be made wherein, in a case where the features after conversion are expressed by vector X'=($\Sigma xj^2$, 1, 1, x1, x2, . . . , xn), the reference features after conversion are vector Y1'=(1, $(\Sigma y1j^2)$, −z, −2y11, −2y12, −2y1n). $\Sigma xj^2$ here means the summation of $xj^2$ from 1 through n for j (i.e., the summation of squares of the elements from x1 through xn), and $\Sigma y1j^2$ means the summation of $y1j^2$ from 1 through n for j (i.e., the summation of squares of the elements from y11 through y1n).

(10) The order in which the various types of processing shown in the above embodiments (e.g., the sequences illustrated in FIGS. 8 and 11, etc.) is not necessarily restricted to the above-described order. The order of execution may be changed, multiple procedures may be performed in parallel, and part of the procedures may be omitted, without departing from the spirit of the disclosure.

(11) The devices in the embodiments have been described as being device including, for example, a processor, memory, communication interface, and so forth, but these device may further include other hardware components, such as a hard disk drive, a display, a keyboard, a mouse, and so forth. Instead of programs stored in memory being executed by the processor, so as to realize functions by way of software, the functions may be realized by dedicated hardware (digital circuits, analogue circuits, communication circuits, etc.).

(12) Part or all of the components of which the devices described in the above embodiments are configured may be configured as one system large scale integration (LSI). A system LSI is a super-multifunctional LSI fabricated with multiple components integrated on a single chip, and specifically is a computer system configured including a microprocessor, ROM, RAM, and so forth. The RAM stores computer programs. The system LSI achieves its functions by the microprocessor operating according to the computer programs. The components of which the above-described devices are configured may each be independently formed as a single chip, or part or all may be included in a single chip. While a system LSI has been described, there are different names according to the degree of integration, such as IC, LSI, super LSI, and ultra LSI. The way in which the integrated circuit is formed is not restricted to LSIs, and may be realized by dedicated circuits or general-purpose processors. A Field Programmable Gate Array (FPGA) capable of being programmed after manufacturing the LSI, or a reconfigurable processor of which the connections and settings of circuit cells within the LSI can be reconfigured, may be used. Moreover, in the event of the advent of an integrated circuit technology which would replace LSIs by advance of semiconductor technology or a separate technology derived therefrom, such a technology may be used for integration of the functional blocks, as a matter of course. Application of biotechnology and the like is a possibility.

(13) Part or all of the components of which the above-described devices are configured may be configured as an IC card detachably mountable to each device, or a standalone module. The IC card or the module is a computer system configured including a microprocessor, ROM, RAM, and so forth. The IC card or the module may include the above-described super-multifunctional LSI. The IC card or the module achieves its functions by the microprocessor operating according to the computer program. The IC card or the module may be tamper-resistant.

(14) One form of the present disclosure may be a search method including all or part of the processing procedures illustrated in FIGS. 8 and 11 and so forth, for example. For example, the search method is a search method for searching for data in a first device (e.g., data computation devices 200 and 200a). Encrypted first converted features obtained as a result of encrypting by predetermined encryption first converted features, obtained as the result of performing first conversion on features expressed as a vector including multiple components extracted from user privacy data, are received from a second device (e.g., user terminal device 100). Encrypted second converted features obtained by encrypting by predetermined encryption the second converted features, obtained as a result of performing second conversion on each of multiple reference features expressed by a vector including the same number of components as the features where each of the multiple reference features correspond to one of multiple sets of reference data is acquired. Inner product computation is performed using the acquired encrypted second converted features and encrypted first converted features regarding each of the multiple encrypted second converted features. Information indicating the one or more sets of reference data each having a correlation with one or more encrypted second converted features regarding which the results of the inner product computation satisfy a certain condition is transmitted to the second device. The first conversion, the second conversion and the predetermined encryption, are arranged so that the results of inner product computation of the encrypted first converted features and the one acquired encrypted second converted features are a value related to the Euclidean distance of the features corresponding to the encrypted first converted features and the reference features corresponding to the one encrypted second converted features.

One form of the present disclosure may be a program (computer program) that realizes predetermined data search processing according to this search method, or may be digital signals made up of the computer program. For example, the program may be predetermined data search processing including a receiving step (e.g., receiving a request according to step S107), a converting step (e.g., step S101), an encrypting step (step S102), a selecting step (e.g., steps S108 through S111), and a transmitting step (e.g., step S113), that is executed by the processor. In the receiving step, encrypted first converted features obtained as a result of encrypting by predetermined encryption first converted features, obtained as the result of performing first conversion on features expressed as a vector including the same number of components as reference features extracted from privacy data of the user, are received from a the user terminal device 100. Second converted features obtained by subjecting reference features to second conversion, regarding each of the multiple reference features, is generated in the conversion step. Encrypted second converted features are generated by encrypting by predetermined encryption the second converted features, regarding each of the multiple second converted features generated in the converting step, in the encrypting step. Inner product computation is performed using the multiple encrypted second converted features generated in the encrypting step, and encrypted first converted features, regarding each of the encrypted second converted features, and one or more encrypted second converted features of which the inner product computation results satisfy the certain condition are selected in the selecting step. Information indicating the one or more sets of reference data having a correlation with each of one or more encrypted second converted features selected in the selecting step is transmitted to the user terminal device 100. The first conversion, the second conversion and the predetermined encryption, are arranged so that the results of inner product computation of the encrypted first converted features and the one encrypted second converted features generated in the encrypting step are a value related to the Euclidean distance of the features corresponding to the encrypted first converted features and the reference features corresponding to the one encrypted second converted features.

One form of the present disclosure may be the computer program or the digital signals recorded in a computer-readable recording medium, such as for example, a flexible disk, hard disk, compact disc ROM (CD-ROM), magneto-optical (MO) disk, digital versatile disc (DVD), DVD-ROM, DVD-RAM, Blu-ray Disc (BD, a registered trademark), semiconductor memory, or the like. The present disclosure may also be the digital signals recorded in these recording mediums.

One form of the present disclosure may be an arrangement where the computer program or the digital signals are transmitted over an electric communication line, wireless or cable communication line, a network of which the Internet is representative, data broadcasting, or the like. One form of the present disclosure may be a computer system having a microprocessor and memory, where the memory stores the computer program, and the microprocessor operates according to the computer program. This may also be carried out by another independent computer system, by the program or digital signals being recorded in the recording medium and being transported, or by the program or digital signals being transferred over the network or the like.

The technology related to the search systems 10 and 11 described in the above embodiments can be realized in the above described service arrangements (see FIG. 1A), and also by the following types of cloud service, for example. However, the type of cloud service by which the above technology described in the above embodiments can be realized is not restricted to these.

Service Type 1: In-House Data Center Type Cloud Service

Figure 13:
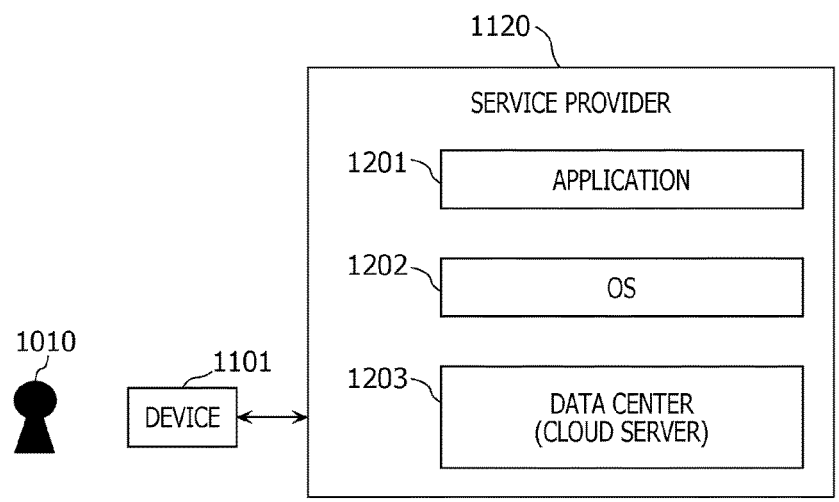
FIG. 13 is a conceptual diagram illustrating a service (type 1) provided by the search system.

FIG. 13 is a diagram illustrating the overall image of services which the search system provides in a service type 1 (in-house data center type cloud service). This type is a type where the service provider 1120 obtains information input from the device 1101 by the user 1010, and provides the user 1010 with service from the device 1101.

In this type, the service provider 1120 functions as a data center operator. That is to say, the service provider 1120 has a cloud server to manage big data. Accordingly, the data center operator does not exist. In this type, the service provider 1120 has the cloud server 1203 as the data center, and also manages the operating system (OS) 1202 and application programs (applications) 1201. The service provider 1120 provides services by communicating with the device 1101 by the cloud server 1203, using the OS 1202 and applications 1201.

Service Type 2: IaaS Usage Type Cloud Service

Figure 14:
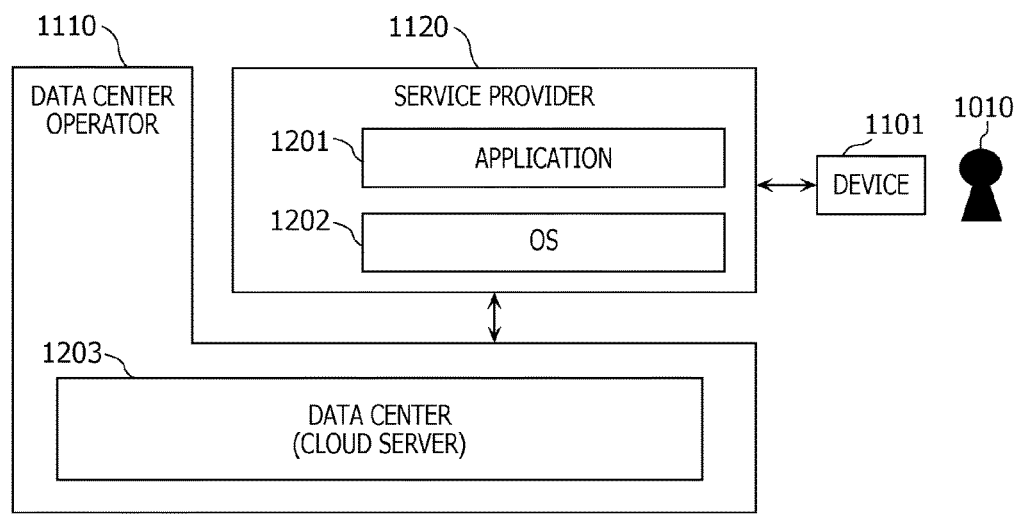
FIG. 14 is a conceptual diagram illustrating a service (type 2) provided by the search system.

FIG. 14 is a diagram illustrating the overall image of services which the search system provides in a service type 2 (IaaS usage type cloud service). IaaS stands for "Infrastructure as a Service", and is a cloud service providing model where the base for computer system architecture and operation itself is provided as an Internet-based service.

In this type, the data center operator 1110 operates and manages the data center 1203 (cloud server). The service provider 1120 manages the OS 1202 and applications 1201. The service provider 1120 provides services using the OS 1202 and applications 1201 managed by the service provider 1120.

Service Type 3: PaaS Usage Type Cloud Service

Figure 15:
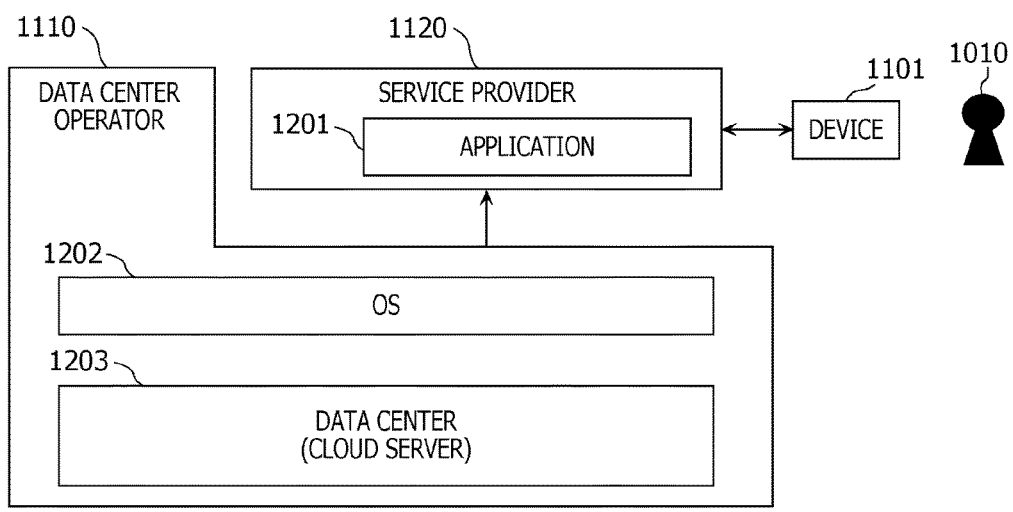
FIG. 15 is a conceptual diagram illustrating a service (type 3) provided by the search system.

FIG. 15 is a diagram illustrating the overall image of services which the search system provides in a service type 3 (PaaS usage type cloud service). PaaS stands for "Platform as a Service", and is a cloud service providing model where a platform serving as the foundation for software architecture and operation is provided as an Internet-based service.

In this type, the data center operator 1110 manages the OS 1202 and operates and manages the data center 1203 (cloud server). The service provider 1120 also manages the applications 1201. The service provider 1120 provides services using the OS 1202 managed by the data center operator 1110 and applications 1201 managed by the service provider 1120.

Service Type 4: SaaS Usage Type Cloud Service

Figure 16:
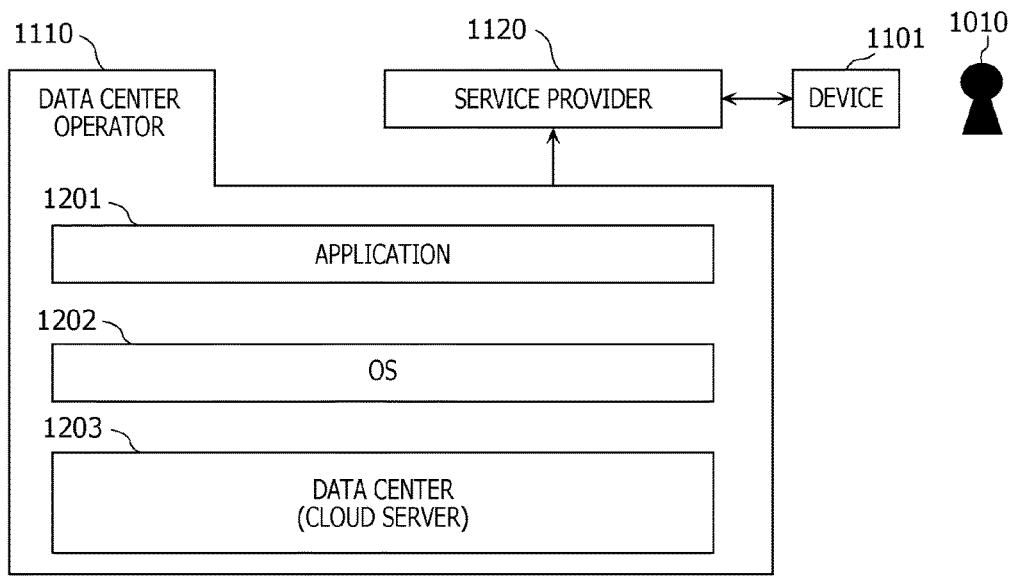
FIG. 16 is a conceptual diagram illustrating a service (type 4) provided by the search system.

FIG. 16 is a diagram illustrating the overall image of services which the search system provides in a service type 4 (SaaS usage type cloud service). SaaS stands for "Software as a Service". A SaaS usage type cloud service is a cloud service providing model having functions where corporations or individuals who do not have a data center (cloud server) can use applications provided by a platform provider having a data center (cloud server) for example, over a network such as the Internet.

In this type, the data center operator 1110 manages the applications 1201, manages the OS 1202, and operates and manages the data center 1203 (cloud server). The service provider 1120 provides services using the OS 1202 and applications 1201 managed by the data center operator 1110.

In each of these types, the service provider 1120 provides services. The service provider or data center operator may develop the OS, applications, database for big data, and so forth, in-house, or may commission this to a third party, for example.

Forms realized by combining the components and functions shown in the above embodiments are also encompassed by the scope of the present disclosure.

The present disclosure is applicable to a search system where searching is performed while keeping user information secret.

What is claimed is:

1. A data search method of a first device that includes a processor and a memory storing a digital signal having a plurality of sets of privacy data acquired from a plurality of persons and a digital signal having a plurality of reference features corresponding to the plurality of sets of privacy data of the digital signal having the plurality of sets of privacy data, the plurality of reference features each being representable by an n-dimensional vector, the method comprising:

transmitting from a second device that includes a memory and a processor, to the first device via a communication network a digital signal having first encrypted features, the second device having encrypted a digital signal having first converted features to generate the digital signal having the first encrypted features, the second device having performed a first conversion of a digital signal having first features extracted from privacy data of a user to generate the digital signal having the first converted features, the second device having encrypted the digital signal having the first converted features using inner product encryption, the first features being representable by an n-dimensional vector, and the first converted features being representable by an n-dimensional vector;

generating with the first device a digital signal having a plurality of second converted features by performing a second conversion of the digital signal having the plurality of reference features;

generating with the first device a digital signal having a plurality of second encrypted features by encrypting the digital signal having the plurality of second converted features using inner product encryption;

acquiring with the first device a digital signal having a plurality of inner product values by determining with the first device values of an inner product of each of the first encrypted features and the plurality of second encrypted features;

determining with the first device whether a first inner product value of the plurality of inner product values of the digital signal having a plurality of inner product values is not greater than a predetermined threshold value, the first inner product value indicating a Euclidean distance between the first features and first reference features out of the plurality of reference features; and transmitting from the first device to the second device via the communication network a digital signal representing first privacy data corresponding to the first reference features of the digital signal having the reference features out of the plurality of sets of privacy data of the digital signal having the plurality of sets of privacy data when the first device determines that the first inner product value of the plurality of inner product values is not greater than the predetermined threshold, wherein the second device subjects the digital signal having the first features to the first conversion and the first device subjects the digital signal having the plurality of reference features to the second conversion so that a product of an i-dimensional component (where i≤n) of the first converted features and an i-dimensional component of each of the plurality of second converted features is representable by a polynomial following unfolding of the Euclidean distance between the first features of the digital signal having the first features and the plurality of reference features of the digital signal having the plurality of reference features, wherein the privacy data of the user includes vital signs data of the user.

2. The search method according to claim 1, wherein the privacy data of the user includes a history of the user having operated a device.

3. The search method according to claim 1, wherein the first features include a component indicating an index relating to at least one of a shape, a size, a weight, a state, and a movement, of all or one part of a body of the user.

4. The search method according to claim 1, wherein the plurality of sets of privacy data includes vital signs data of the plurality of persons.

5. The search method according to claim 1,
wherein the first features are representable by X =(x1, x2, x3, ..., xn),
wherein the converted first features converted by the first conversion are representable by X', where X' =($\Sigma xj^2$, 1, x1, x2, ..., Xn),
wherein the plurality of reference features are representable by Yk =(y1, y2, y3, ..., yn), where k ≥2, and
wherein the plurality of second converted reference features converted by the second conversion are representable by Yk', where Yk' =(1, $\Sigma yj^2$, -2y1, -2y2, ..., -2yn) and where k ≥2.

6. The search method according to claim 1,
wherein the first features are representable by X =(x1, x2, x3, ..., xn),
wherein the converted first features converted by the first conversion are representable by into X', where X' =($\Sigma(wj \cdot xj^2)$, 1, x1, x2, ..., Xn),
wherein the plurality of reference features are representable by Yk =(y1, y2, y3, ..., yn), where k ≥2,
wherein the plurality of second converted reference features converted by the second conversion are representable by Yk', where Yk' =(1, $\Sigma(wj \cdot yj^2)$, -2w1·y1, -2w2·y2, ..., -2wn·yn), and
wherein the Euclidean distance includes weighted Euclidean distance.

7. A search device comprising a first device comprising:
a processor; and
a memory storing a digital signal having a plurality of sets of privacy data acquired from a plurality of persons and storing a digital signal having a plurality of reference features corresponding to the plurality of sets of privacy data of the digital signal having the plurality of sets of privacy data, the plurality of sets of reference features each being represented by an n-dimensional vector,
wherein the processor of the first device is configured to perform operations including:
  receiving a digital signal having first encrypted features transmitted via a communication network from a second device including a memory and a processor,
    the second device having encrypted a digital signal having first converted features to generate the digital signal having the first encrypted features,
    the second device having performed a first conversion of a digital signal having first features extracted from privacy data of a user to generate the digital signal having the first converted features,
    the second device having encrypted the digital signal having the first converted features using inner product encryption, the first features being representable by an n-dimensional vector, and the first converted features being representable by an n-dimensional vector,
  generating a digital signal having a plurality of second converted features by performing a second conversion of the digital signal having the plurality of reference features,
  generating a digital signal having a plurality of second encrypted features by encrypting the digital signal having the plurality of second converted features using inner product encryption,
  acquiring a digital signal having a plurality of inner product values by determining values of an inner product of each of the first encrypted features and the plurality of second encrypted features,
  determining whether a first inner product value of the plurality of inner product values of the digital signal having the plurality of inner product values is not greater than a predetermined threshold value, the first inner product value indicating a Euclidean distance between the first features and first reference features out of the plurality of reference features, and
  transmitting from the first device to the second device via the communication network a digital signal representing first privacy data corresponding to the first reference features of the digital signal having the reference features out of the plurality of sets of privacy data of the digital signal having the plurality of sets of privacy data when the first device determines that the first inner product value of the plurality of inner product values is not greater than the predetermined threshold,
wherein the second device subjects the digital signal having the first features to the first conversion and the first device subjects the digital signal having the plurality of reference features to the second conversion so that a product of an i-dimensional component (where i ≤n) of the first converted features and an i-dimensional component of each of the plurality of second converted features is representable by a polynomial following unfolding of the Euclidean distance between the first features of the digital signal having the first features and the plurality of reference features of the digital signal having the plurality of reference features,
wherein the privacy data of the user includes vital signs data of the user.

8. A search system comprising:
a first device and a second device connected to the first device via a communication network,
wherein the first device includes a first processor, and a memory storing a digital signal having a plurality of sets of privacy data acquired from a plurality of persons and a digital signal having a plurality of reference features corresponding to the plurality of sets of privacy data of the digital signal having the plurality of sets of privacy data, the plurality of sets of privacy data of the digital signal having the plurality of sets of privacy data each being representable by an n-dimensional vector,
wherein the second device includes a second processor,
wherein the second processor of the second device is configured to perform operations including:
  generating a digital signal having first converted features by subjecting first features of a digital signal having the first features and extracted from the digital signal having the plurality of sets of privacy data of the user to a first conversion, the first features of the digital signal having the first features being representable by an n-dimensional vector, and the first converted features the digital signal having the first converted features being representable by an n-dimensional vector,
  generating a digital signal having first encrypted features by encrypting the digital signal having the first converted features using inner product encryption, and
  transmitting the digital signal having the first encrypted features to the first device via the communication network,
and wherein the first processor of the first device executes the operations of receiving from the second device via the communication network the digital signal having the first encrypted features, generating a digital signal having a plurality of second converted features by a second conversion of the digital signal having the plurality of reference features, generating a digital signal having a plurality of second encrypted features by encrypting the digital signal having the plurality of second converted features using inner product encryption, acquiring a digital signal having a plurality of inner product values by determining values of an inner product of each of the first encrypted features and the plurality of second encrypted features, determining whether a first inner product value of the plurality of inner product values of the digital signal having a plurality of inner product values is not greater than a predetermined threshold value, the first inner product value indicating a Euclidean distance between the first features and first reference features out of the plurality of reference features, and transmitting from the first device to the second device via the communication network a digital signal representing first privacy data corresponding to the first reference features of the digital signal having the reference feature out of the plurality of sets of privacy data of the digital signal having the plurality of sets of privacy data when the first device determines that the first inner product value of the plurality of inner product values is not greater than the predetermined threshold, wherein the second device subjects the digital signal having the first features to the first conversion and the first device subjects the digital signal having the plurality of reference features to the second conversion so that a product of an i-dimensional component (where i ≤n) of the first converted features and an i-dimensional component of each of the plurality of second converted features is representable by a polynomial following unfolding of the Euclidean distance between the first features of the digital signal having the first features and the plurality of reference features of the digital signal having the plurality of reference features, wherein the privacy data of the user includes vital signs data of the user.

9. A non-transitory computer-readable recording medium storing a program that causes a processor to execute a search method of a first device that includes a processor and a memory storing a digital signal having a plurality of sets of privacy data acquired from a plurality of persons and a digital signal having a plurality of reference features corresponding to the plurality of sets of privacy data, the plurality of reference features of the digital signal each being represented by an n-dimensional vector, the method comprising:

transmitting from a second device that includes a memory and a processor, to the first device via a communication network a digital signal having first encrypted features, the second device having encrypted a digital signal having first converted features to generate the digital signal having the first encrypted features, the second device having performed a first conversion of a digital signal having first features extracted from privacy data of a user to generate the digital signal having the first converted features, the second device having encrypted the digital signal having the first converted features using inner product encryption, the first features being representable by an n-dimensional vector, and the first converted features being representable by an n-dimensional vector;

generating with the first device a digital signal having a plurality of second converted features by performing a second conversion of the digital signal having the plurality of reference features;

generating with the first device a digital signal having a plurality of second encrypted features by encrypting the digital signal having the plurality of second converted features using inner product encryption;

acquiring with the first device a digital signal having a plurality of inner product values by determining with the first device values of an inner product of each of the first encrypted features and the plurality of second encrypted features;

determining with the first device whether a first inner product value of the plurality of inner product values of the digital signal having a plurality of inner product values is not greater than a predetermined threshold value, the first inner product value indicating a Euclidean distance between the first features and first reference features out of the plurality of reference features, and transmitting from the first device to the second device via the communication network a digital signal representing first privacy data corresponding to the first reference features of the digital signal having the reference features out of the plurality of sets of privacy data of the digital signal having the plurality of sets of privacy data when the first device determines that the first inner product value of the plurality of inner product values is not greater than the predetermined threshold, wherein the second device subjects the digital signal having the first features to the first conversion and the first device subjects the digital signal having the plurality of reference features to the second conversion so that a product of an i-dimensional component (where i ≤n) of the first converted features and an i-dimensional component of each of the plurality of second converted features is representable by a polynomial following unfolding of the Euclidean distance between the first features of the digital signal having the first features and the plurality of reference features of the digital signal having the plurality of reference features, wherein the privacy data of the user includes vital signs data of the user.

* * * * *